United States Patent
Koyama

(10) Patent No.: US 11,140,279 B2
(45) Date of Patent: Oct. 5, 2021

(54) COMMUNICATION SYSTEM, COMMUNICATION APPARATUS, CONTROL METHOD, NON-TRANSITORY COMPUTER-READABLE STORAGE MEDIUM, AND SERVER APPARATUS

(71) Applicant: CANON KABUSHIKI KAISHA, Tokyo (JP)

(72) Inventor: Jun Koyama, Tokorozawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 127 days.

(21) Appl. No.: 16/668,863

(22) Filed: Oct. 30, 2019

(65) Prior Publication Data

US 2020/0068077 A1 Feb. 27, 2020

Related U.S. Application Data

(63) Continuation of application No. PCT/JP2018/008034, filed on Mar. 2, 2018.

(30) Foreign Application Priority Data

May 2, 2017 (JP) .............................. JP2017-091943

(51) Int. Cl.
*H04N 1/00* (2006.01)
*H04N 101/00* (2006.01)

(52) U.S. Cl.
CPC ....... *H04N 1/00209* (2013.01); *H04N 1/0023* (2013.01); *H04N 1/00214* (2013.01);
(Continued)

(58) Field of Classification Search
CPC ............. H04N 1/00209; H04N 1/0023; H04N 1/00214; H04N 1/00251; H04N 1/00244;
(Continued)

(56) References Cited

U.S. PATENT DOCUMENTS

2009/0128634 A1* 5/2009 Miura .................... H04N 5/772
348/207.1
2015/0281340 A1 10/2015 Lea
(Continued)

FOREIGN PATENT DOCUMENTS

JP 2013-021526 A 1/2013
JP 2016-053827 A 4/2016

OTHER PUBLICATIONS

The May 15, 2018 International Search Report of International Application No. PCT/JP2018/008034 dated Nov. 8, 2018.

*Primary Examiner* — Daniel M Pasiewicz
(74) *Attorney, Agent, or Firm* — Cowan, Liebowitz & Latman, P.C.

(57) ABSTRACT

This invention makes it possible to, in a pull transfer communication protocol, to interrupt forwarding of information on the server side at a timing desired by a user. To achieve this, a client includes a first request unit for transmitting a content request to the server and the server includes a first response unit for transmitting content requested from the first request unit to the client. The client further includes a second request unit for requesting the server to make a response if a predetermined status has occurred, and the server further includes a second response unit for deferring, if the request made by the second request unit is received, a response if the predetermined status has not occurred, and transmitting the response to the client if the predetermined status has occurred.

14 Claims, 21 Drawing Sheets

(52) U.S. Cl.
CPC ..... *H04N 1/00244* (2013.01); *H04N 1/00251* (2013.01); *H04N 1/00917* (2013.01); *H04N 2101/00* (2013.01); *H04N 2201/0084* (2013.01)

(58) Field of Classification Search
CPC ........... H04N 1/00915; H04N 1/00917; H04N 2101/00; H04N 2201/0084
See application file for complete search history.

(56) References Cited

U.S. PATENT DOCUMENTS

2018/0322148 A1* 11/2018 Ishizu ..................... H04L 67/04
2018/0324075 A1* 11/2018 Kawai ................... H04L 67/025

* cited by examiner

FIG. 3A

| | API NAME | REQUEST (ARGUMENT) | RESPONSE | DESCRIPTION |
|---|---|---|---|---|
| 301 | Request ProductInfo | NONE | ·PRODUCT NAME<br>·MANUFACTURER NAME<br>·FIRMWARE VERSION<br>·SERIAL NUMBER | ACQUIRE PRODUCT INFORMATION OF DIGITAL CAMERA |
| 302 | Request MemoryInfo | NONE | ·STORAGE AREA ID<br>·AVAILABLE STORAGE CAPACITY<br>·FREE SPACE<br>·NUMBER OF STORED PIECES OF CONTENT | ACQUIRE INFORMATION REGARDING STORAGE AREA OF DIGITAL CAMERA |
| 303 | Request ContentInfo | ·STORAGE AREA ID<br>·TYPE OF CONTENT FORMAT<br>·NUMBER OF ACQUISITION REQUESTS | ·CONTENT ID<br>·CONTENT FILE NAME<br>·CONTENT FILE SIZE<br>·CONTENT FILE GENERATION DATE AND TIME | ACQUIRE CONTENT ID AND BASIS INFORMATION OF CONTENT FILE STORED IN STORAGE AREA OF DIGITAL CAMERA |

FIG. 3B

| | | | |
|---|---|---|---|
| 304 | Request Content | ·CONTENT ID<br>·CONTENT SIZE | ·CONTENT FILE | ACQUIRE CONTENT FILE |
| 305 | RequestEvent | NONE | ·STATE CHANGE INFORMATION | ACQUIRE STATE CHANGE OF DIGITAL CAMERA |
| 306 | Request ContentList | NONE | ·CONTENT ID<br>·CONTENT FILE SIZE<br>·CONTENT FILE GENERATION DATE AND TIME | ACQUIRE IDs OF ALL CONTENT RECEIVED FROM DIGITAL CAMERA |
| 307 | Cancel RequestContent | NONE | ·PROCESSING RESULT | CANCEL ACQUISITION OF CONTENT FILES |
| 308 | Request EventAnd Cancel | NONE | ·STATE CHANGE INFORMATION<br>·PROCESSING RESULT | ACQUIRE STATE CHANGE OF DIGITAL CAMERA OR CANCEL ACQUISITION OF CONTENT FILES |
| | ... | | | |

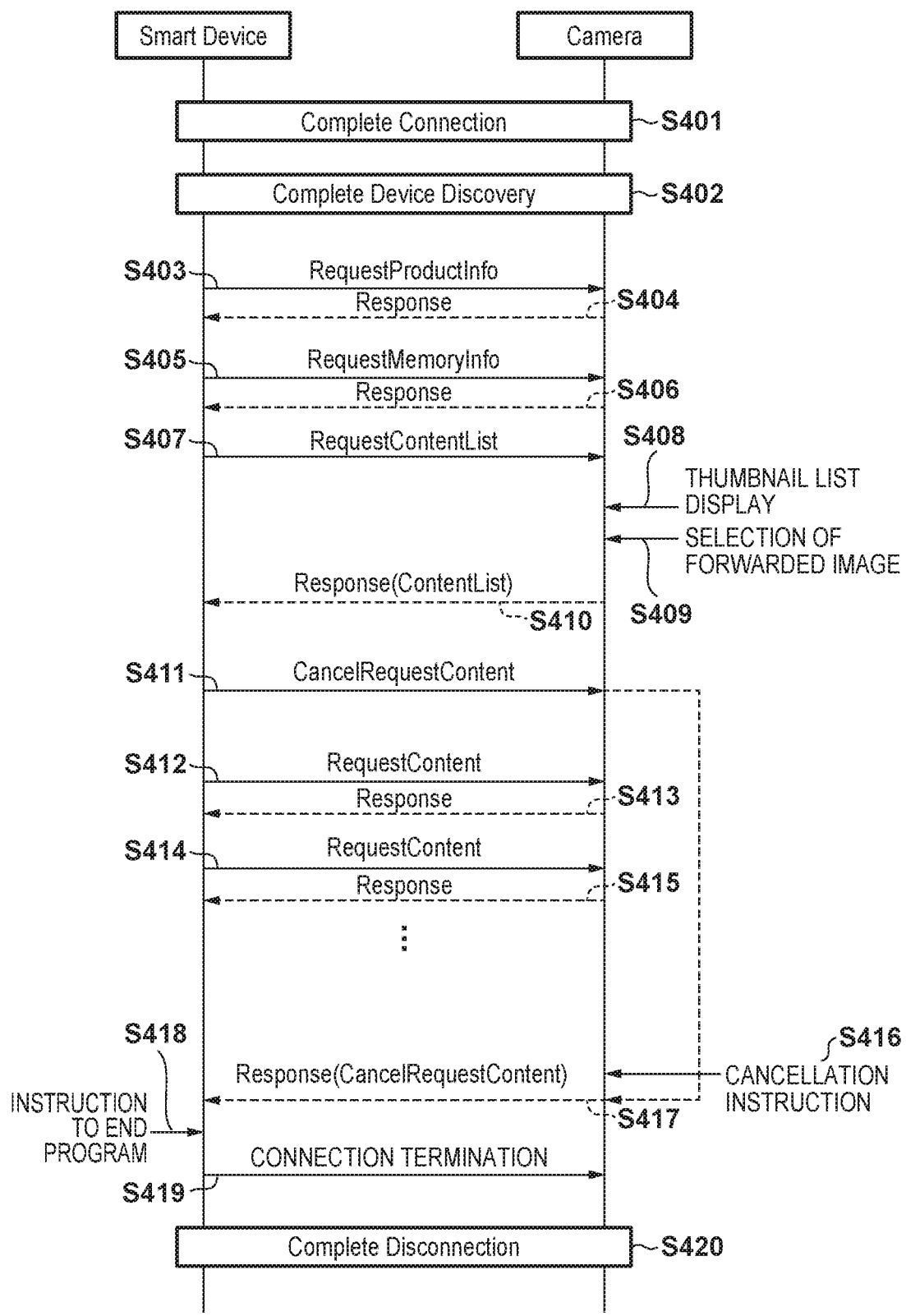

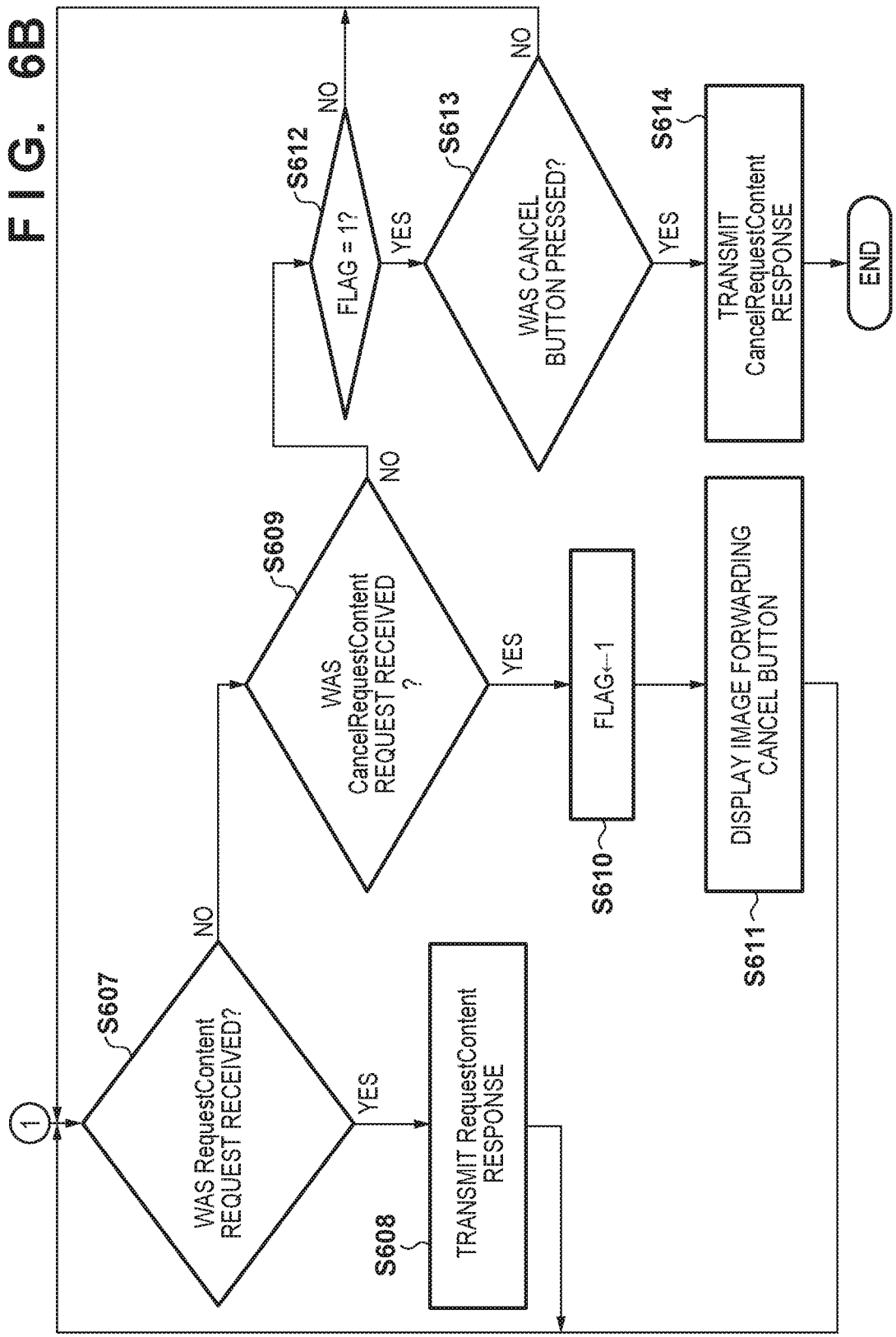

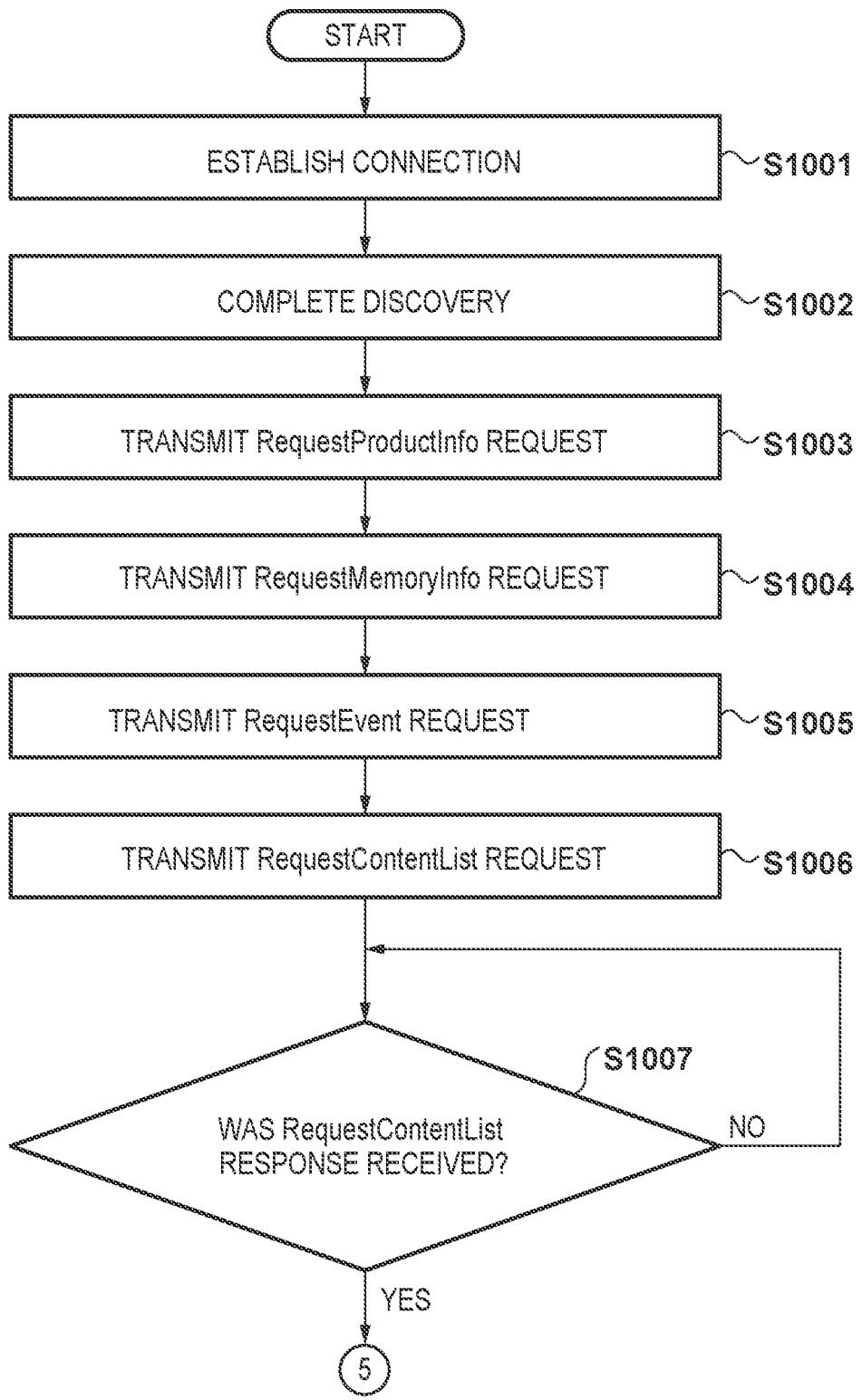

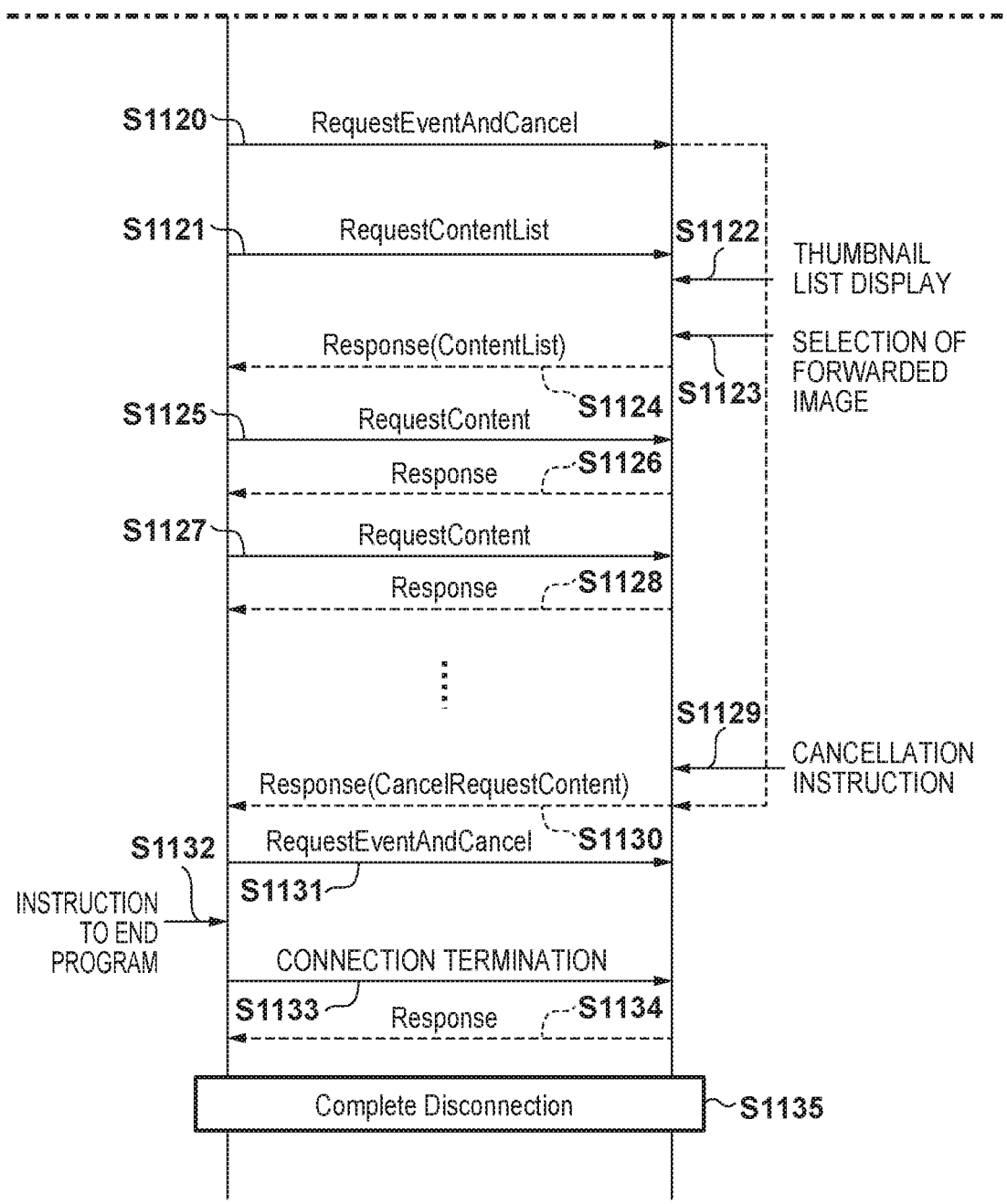

COMMUNICATION SYSTEM, COMMUNICATION APPARATUS, CONTROL METHOD, NON-TRANSITORY COMPUTER-READABLE STORAGE MEDIUM, AND SERVER APPARATUS

CROSS-REFERENCE TO RELATED APPLICATIONS

This application is a Continuation of International Patent Application No. PCT/JP2018/008034, filed Mar. 2, 2018, which claims the benefit of Japanese Patent Application No. 2017-091943, filed May 2, 2017, both of which are hereby incorporated by reference herein in their entirety.

BACKGROUND OF THE INVENTION

Field of the Invention

The present invention relates to a communication system, a communication apparatus, a control method thereof, a non-transitory computer-readable storage medium, and a server apparatus.

Background Art

The development of the communication function of image processing apparatuses (or image capturing apparatuses) such as a digital camera has enabled digital cameras, PCs, and mobile phones, for example, to communicate with and exchange content each other. At present, it is also possible for a camera to function as a server to implement remote shooting by using a server/client system such as HTTP. In a system such as a server/client system, there is often a certain limitation in voluntarily providing some sort of notification from the server to the client.

In this respect, it is conceivable that he server voluntarily the client at the necessary timing by the client sending a request first, and the server maintaining a deferred state of that response. As such a method, there is a method in which a status notification request is transmitted in advance, and a response is returned at the timing at which the server status has changed (PTL 1).

However, the method according to PTL 1 only assumes status notification for the server. Depending on the range of applications of the server/client system, there may be cases where making a notification other than a status notification is desired.

CITATION LIST

Patent Literature

PTL 1: Japanese Patent Laid-Open No. 2013-21526

SUMMARY OF THE INVENTION

To solve this problem, according to an aspect of the present invention, there is provided a communication system including a client, and a server that transmits information in response to a request from the client, wherein the client includes a first request unit configured to transmit a content request to the server, wherein the server includes a first response unit configured to transmit content requested from the first request unit to the client, wherein the client further includes a second request unit configured to request the server to make a response if a predetermined status has occurred, and wherein the server further includes a second response unit configured to defer, if the request made by the second request unit is received, a response if the predetermined status has not occurred, and transmit the response to the client if the predetermined status has occurred.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3A is a diagram showing a list of APIs provided by the digital camera according to the embodiment.

FIG. 3B is a diagram showing a list of APIs provided by the digital camera according to the embodiment.

FIG. 4 is a diagram showing an example of a communication sequence between a digital camera and a smart device according to a first embodiment.

FIG. 6B is a flowchart illustrating the processing procedure of the digital camera according to the first embodiment.

FIG. 10A is a flowchart illustrating a processing procedure of the smart device according to the second embodiment.

FIG. 11B is a diagram showing the example of a communication sequence between a digital camera and a smart device according to the third embodiment.

DESCRIPTION OF THE EMBODIMENTS

In the following, embodiments of the present invention will be described in detail with reference to the accompanying drawings. It should be noted that the embodiments described below are merely exemplary means for implementing the present invention, and may be appropriately modified or changed depending on the configuration of an apparatus to which the invention is to be applied and various conditions. The embodiments may be also combined as appropriate.

First Embodiment

Configuration of Digital Camera 100

Figure 1A:
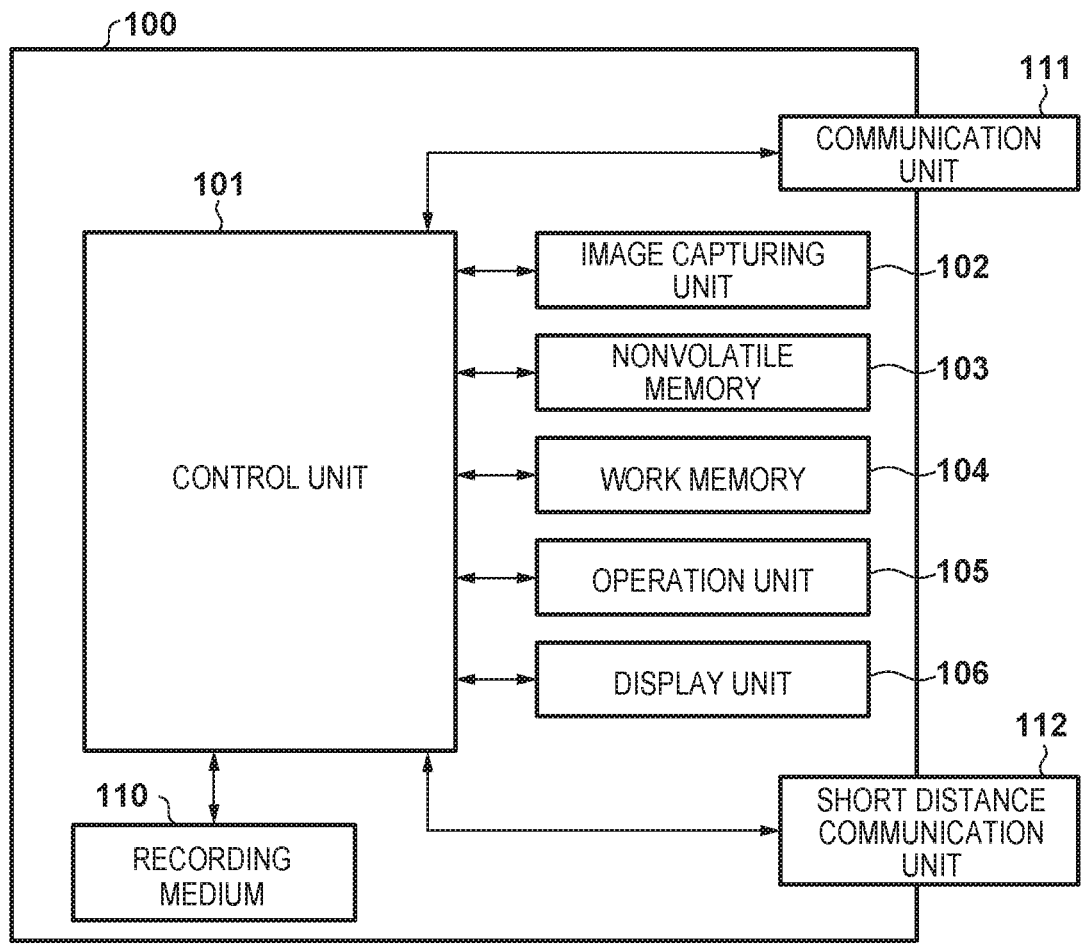
FIG. 1A is a block diagram showing a configuration of a digital camera according to an embodiment.

FIG. 1A is a block diagram showing an exemplary configuration of a digital camera 100 serving as a member of a communication system to which the present embodiment is applied. Note that although a digital camera in which image data can be recorded in a recording medium will be described here as an example of the communication apparatus, the communication apparatus is not limited thereto. For example, the communication apparatus may be a portable media player, a so-called tablet device, a personal computer, or an information processing apparatus that is connected to or incorporated in various facilities. In addition, data to be handled is not limited to image data, and may be audio data, document data, or the like.

A control unit 101 controls various units of the digital camera 100 in accordance with input signals and a program described below Note that the overall apparatus may also be controlled by a plurality of pieces of hardware sharing the processing therebetween, instead of the control unit 101 controlling the overall apparatus.

An image capturing unit 102 is composed of, for example, an optical lens unit, an optical system that controls a diaphragm, zooming, focusing, and the like, and an image capturing element for converting light (video image) introduced through the optical lens unit into an electrical image signal. In general, a CMOS (Complementary Metal Oxide Semiconductor), a CCD (Charge Coupled Device), or the like is used as the image capturing element. By being controlled by the control unit 101, the image capturing unit 102 converts object light of which image is formed by the lens included in the image capturing unit 102 into an electric signal using the image capturing element, performs noise reduction processing and the like, and outputs digital data as image data. The control unit 101 of the digital camera 100 according to the present embodiment encodes captured image data, and records the encoded data in accordance with DCF (Design Rule for Camera File system) in the recording medium 110 as a file.

A nonvolatile memory 103 is an electrically erasable/recordable nonvolatile memory, and stores, for example, a program described below that is executed by the control unit 101, and various types of data relating to settings. A work memory 104 is used as a buffer memory that temporarily holds image data captured by the image capturing unit 102, an image display memory of a display unit 106, a work area for the control unit 101, or the like.

An operation unit 105 is used to accept an instruction given to the digital camera 100 from a user. The operation unit 105 includes, for example, a power button for allowing the user to make an instruction to turn ON/OFF the power supply of the digital camera 100, a release switch for instructing image capturing, and a reproduction button for instructing reproduction of image data. The operation unit 105 further includes an operation member such as a dedicated connection button for starting communication with an external device via a communication unit 111 described below. In addition, the operation unit 105 includes a touch panel formed on a display unit 106 described below. Note that the release switch includes a first switch and a second switch for detecting the pressed state in two stages. The first switch is turned ON when the release switch is brought into the so-called half-pressed state. Consequently, an instruction to prepare for image capturing, such as AF (auto focus) processing, AE (auto exposure) processing, AWB (auto white balance) processing, and EF (electronic flash preliminary emission) processing, is accepted. The second switch is turned ON when the release switch is brought into the so-called full-pressed state. Consequently, an instruction to perform image capturing is accepted.

A display unit 106 displays a viewfinder image during image capturing, captured image data, various menus and characters for interactive operations, and the like. Note that the display unit 106 may not necessarily be built into the digital camera 100. It is sufficient for the digital camera 100 to be able to connect to an internal or external display unit 106, and to include at least a display control function for controlling display of the display unit 106. Note that the operation unit 105 and the display unit 106 constitute a user interface of the digital camera.

A recording medium 110 can record a file of image data output from the image capturing unit 102. The recording medium 110 may be configured to be removable from the digital camera 100, or may be built into the digital camera 100. That is, it is sufficient for the digital camera 100 to include at least unit for accessing the recording medium 110.

A communication unit 111 is an interface for connecting to an external apparatus. The digital camera 100 according to the present embodiment can exchange data with an external apparatus via the communication unit 111. For example, image data generated by the image capturing unit 102 can be transmitted to the external apparatus via the communication unit 111. Note that in the present embodiment, the communication unit 111 includes an interface for communicating with the external apparatus using a so-called wireless LAN in compliance with the WEE 802.11 standard. The control unit 101 implements wireless communication with the external apparatus by controlling the communication unit 111. Note that the communication method is not limited to a wireless LAN, and may include, for example, a wireless communication method such as an infrared communication method, a Bluetooth (registered trademark) communication method, and a Wireless USB. Furthermore, a wired connection such as a USB cable, HDMI, IEEE 1394, and Ethernet may be employed. The communication unit 111 is an example of a first wireless communication unit.

A short distance communication unit 112 is composed of, for example, an antenna for wireless communication, and a modulation/demodulation circuit and a communication controller for processing wireless signals. The short distance communication unit 112 implements short distance communication in compliance with the ISO/IEC 18092 standard (the so-called NFC: Near Field Communication) by outputting a modulated wireless signal from the antenna, and demodulating a wireless signal received by the antenna. In addition, short distance wireless communication is implemented in compliance with a wireless communication method such as an infrared communication method, a Bluetooth (registered trademark) communication method, and a Wireless USB. The short distance communication unit 112 according to the present embodiment is an example of a second wireless communication unit that is disposed on a side portion of the digital camera 100.

The digital camera 100 according to the present embodiment is connected to a smart device 200 described below by starting communication therewith using the communication unit. The communication unit 111 of the digital camera. 100 according to the present embodiment has an AP mode in which the communication unit 111 operates as an access point in an infrastructure mode, and a CL mode in which the communication unit 111 operates as a client in the infrastructure mode. Then, by causing the communication unit 111 to operate in the CL mode, the digital camera 100 according to the present embodiment can operate as a CL device in the infrastructure mode. When the digital camera 100 operates as the CL device, the digital camera 100 can join a network formed by the AP device by connecting to a peripheral AP device. By causing the communication unit 111 to operate in the AP mode, the digital camera 100 according to the present embodiment can operate as a simplified AP (hereinafter referred to as a "simple AP"), which is one type of AP but has more limited functions. When the digital camera 100 operates as the simple AP, the digital camera 100 forms a network by itself. A peripheral apparatus of the digital camera 100 recognizes the digital camera 100 as the AP device, and can join the network formed by the digital camera 100. A program for causing the digital camera 100 to operate in the above-described manner is held in the nonvolatile memory 103, and the user selects between the AP mode and the CL mode by operating the operation unit 105.

Note that the digital camera 100 according to the present embodiment is one type of AP, but is a simple AP that does not have a gateway function for forwarding the data received from the CL device to an Internet service provider or the like. Therefore, even if the digital camera 100 receives data from another apparatus that has joined the network formed by the digital camera 100, the digital camera 100 cannot forward the data to a network such as the Internet.

External Appearance of Digital Camera 100

Figure 1B:
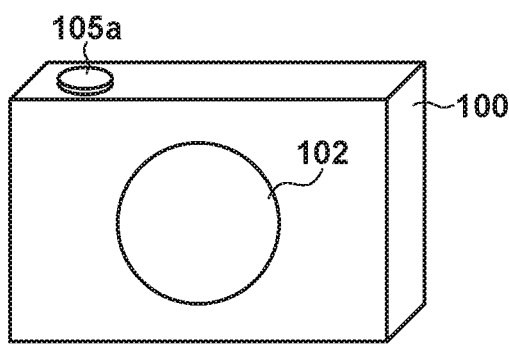
FIG. 1B is a front view of the digital camera according to the embodiment.
Figure 1C:
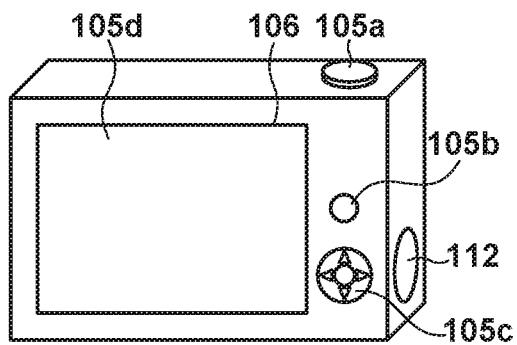
FIG. 1C is a rear view of the digital camera according to the embodiment.

Next, the external appearance of the digital camera 100 will be described. FIGS. 1B and 1C are diagrams showing a front view and a rear view, respectively, of an example of the external appearance of the digital camera 100. A release switch 105a, a reproduction button 105b, a direction key 105c, and a touch panel 105d are operation members included in the operation unit 105 described above. An image obtained as the result of image capturing performed by the image capturing unit 102 is displayed on the display unit 106. The foregoing has described the configuration of the digital camera 100 according to the embodiment.

Regarding Internal Configuration of Smart Device 200

Figure 2:
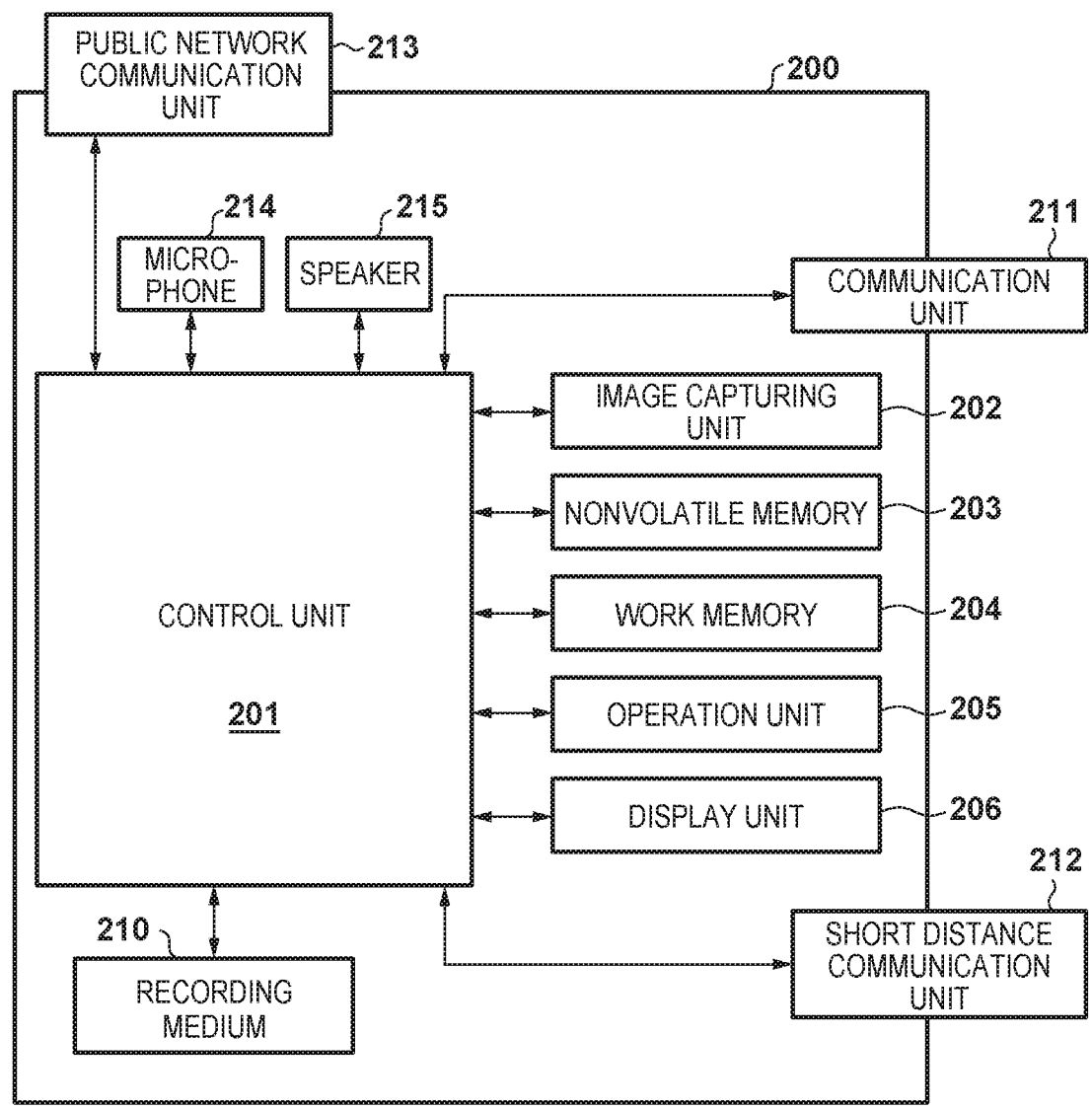
FIG. 2 is a block diagram showing a configuration of a smart device according to the embodiment.

FIG. 2 is a block diagram showing an exemplary configuration of a smart device 200, which is an example of an information processing apparatus (terminal apparatus) that communicates with the digital camera 100 according to the present embodiment. Note that a smart device unit a portable terminal such as a smartphone and a tablet device. Although a smart device will be described as an example of the information processing apparatus here, the information processing apparatus is not limited thereto. For example, the information processing apparatus may be a wireless-enabled digital camera, printer, television, or personal computer.

A control unit 201 controls various units of the smart device 200 in accordance with input signals and a program described below. Note that the overall apparatus may also be controlled by a plurality of pieces of hardware sharing the processing therebetween, instead of the control unit 201 controlling the overall apparatus.

An image capturing unit 202 converts object light of which an image is formed by a lens included in the image capturing unit 202 into an electric signal, performs noise reduction processing and the like, and outputs digital data as image data. The captured image data is accumulated in a buffer memory, is then subjected to a predetermined arithmetic operation or encoding processing by the control unit 201, and is recorded in a recording medium 210 as a file.

A nonvolatile memory 203 is an electrically erasable/recordable nonvolatile memory. In the nonvolatile memory 203, an OS (operating system) serving as basic software executed by the control unit 201, and an application that implements applied functions in cooperation with the OS are recorded. In the present embodiment, the nonvolatile memory 203 stores an application (hereinafter referred to as an "app") for communicating with the digital camera 100.

A work memory 204 is used as an image display memory for a display unit 206, a work area for the control unit 201, and the like. An operation unit 205 is used to accept an instruction made to the smart device 200 by the user. The operation unit 205 includes, for example, a power button for the user to make an instruction to turn ON/OFF the power supply of the smart device 200, and an operation member such as a touch panel formed on the display unit 206. The display unit 206 displays image data, characters for interactive operation, and the like. Note that the display unit 206 does not necessarily need to be included in the smart device 200. It is sufficient for the smart device 200 to be able to connect to the display unit 206, and to include at least a display control function for controlling the display of the display unit 206. Note that the operation unit 205 and the display unit 206 constitute a user interface of the smart device 200.

A recording medium 210 can record image data output from the image capturing unit 202. The recording medium 210 may be configured to be removable from the smart device 200, or may be built into the smart device 200. That is, it is sufficient for the smart device 200 to include at least unit for accessing the recording medium 210.

A communication unit 211 is an interface for connecting to an external apparatus. The communication unit 211 in the present embodiment includes an interface for performing communication using a so-called wireless LAN in compliance with the IEEE 802.11 standard. The smart device 200 according to the present embodiment can exchange data with the digital camera 100 via the communication unit 211. In the present embodiment, the communication unit 211 is an antenna, and the control unit 201 can connect to the digital camera 100 via the antenna. Note that a connection to the digital camera 100 may be established directly, or may be established via an access point. Examples of the protocol for communicating data include HTTP (Hyper Text Transfer Protocol). In addition, PTP/IP (Picture Transfer Protocol over Internet Protocol) over a wireless LAN can also be used. Note that communication with the digital camera 100 is not limited thereto. For example, the communication unit 211 may include a wireless communication module such as an infrared communication module, a Bluetooth (registered trademark) communication module, or a Wireless USB. Furthermore, a wired connection such as a USB cable, HDMI, IEEE 1394, or Ethernet may be employed.

A short distance wireless communication unit 212 is a communication unit for implementing non-contact short distance communication with another device. The short distance wireless communication it 212 is composed of an antenna for wireless communication, and a modulation demodulation circuit and a communication controller for processing wireless signals. The short distance wireless communication unit 212 implements non-contact short distance communication by outputting a modulated wireless signal from the antenna, and demodulates a wireless signal received via the antenna. Here, non-contact communication in compliance with the ISO/IEC 18092 standard (the so-called NFC) is implemented. Upon receiving a data read-out request from another device, the short distance wireless communication unit 212 outputs response data based on the data stored in the nonvolatile memory 203.

A public network communication unit 213 is an interface used for performing public wireless communication. The smart device 200 can make a call to another device via the public network communication unit 213. At this time, the control unit 201 implements a call by inputting/outputting audio signals via a microphone 214 and a speaker 215. In the present embodiment, the public network communication unit 213 is an antenna, and the control unit 201 can connect to a public network via the antenna. Note that one antenna can be used for both the communication unit 211 and the public network communication unit 213. The foregoing has described the smart device 200 according to the embodiment.

Regarding Configuration of APIs for Controlling Digital Camera from External Apparatus FIGS. 3A and 3B are diagrams showing APIs (Application Programming Interfaces) for controlling the digital camera 100 (server) from an external device. The APIs are used when the digital camera 100 according to the embodiment functions in the above-described AP mode.

The digital camera 100 presents APIs that can be controlled from an external device such as the smart device 200. Through the APIs, the digital camera 100 of the embodiment provides, to the external device, device information recorded in the nonvolatile memory 103 of the digital camera 100, and a content file stored in the recording medium 110 of the digital camera 100. The content file is a file that is generated by the digital camera 100, and then stored in the recording medium 110 or the nonvolatile memory 103, and, in the present embodiment, refers to a still image file or a moving image file of an image that has been captured.

The APIs are stored in the nonvolatile memory 103 in advance. Upon establishing communication with the external device (the smart device 200 in the embodiment) via the communication unit 111, the control unit 101 loads a program for executing the APIs to the work memory 104, and waits for an API to be requested from the external apparatus. When the control unit 101 detects that an API has been requested from the external device, the digital camera 100 performs processing according to the type of API, and returns the result of the processing as a response to the external device. Note that the API is executed according to a communication protocol prescribed by the digital camera 100, and the external device communicates with the digital camera 100 using the prescribed communication protocol to request the API. In the description of the present embodiment, it is assumed that the APIs are executed according to HTTP (Hyper Text Transfer Protocol). That is, the digital camera 100 functions as an HTTP server, and the smart device 200 functions as an HTTP client. Note that the communication protocol is not limited to HTTP, and may be another protocol. The protocol that is HTTP itself is widely used, and therefore a description thereof is omitted here. The method for executing an API according to HTTP is implemented as follows: the external device describes, in text, the API name and a required argument in an HTTP request body, and transmits the HTTP request body using a GET method or a POST method to the digital camera 100. Then, the digital camera 100 adds the result of execution of the API to the HTTP response body, and returns the HTTP response body to the external device.

An API list 300 shown in FIGS. 3A and 3B is obtained by tabulating a set of APIs provided by the digital camera 100 of the embodiment that operates in the above-described setup. In the following, each of the APIs will be described.

An API 301 is an API for acquiring product information of the digital camera 100. If a request for the API name "RequestProductInfo" has been received without any argument, the digital camera 100 composes a response from the product name, the manufacturer name, the firmware version, and the serial number of the digital camera 100 that are stored in the nonvolatile memory 103. Then, the digital camera 100 transmits the composed information to a request-originator external device. Note that the product name is the name of the product of the digital camera 100. The manufacturer name is the name of the manufacturer of the digital camera. The firmware version is the version number of a program for controlling the digital camera 100, stored in the nonvolatile memory 103. The serial number is a unique number with which the digital camera 100 can be individually identified.

An API 302 is an API for acquiring information regarding the storage area of the digital camera 100. If a request for the API name "RequestMemoryInfo" has been received without any argument, the digital camera 100 composes a response from the storage area ID, the available storage capacity, free space, and the number of stored content files of the digital camera 100. Then, the digital camera 100 transmits the composed response to the request-originator external device. Note that the storage area ID is an ID (Identification) assigned to each area in which a content file generated by the digital camera 100 can be stored. For example, the storage area ID is assigned to the recording medium 110 of the digital camera 100. The available storage capacity is the upper limit size of the storage area in which content files can be stored. The free space is the size of the space in which no content file is stored in the storage area. The number of stored content files is the total number f content files stored in the storage area.

An API 303 is an API for acquiring a content ID and basic information regarding a content file stored in the storage area of the digital camera 100. If the storage area ID, the type of content format, and the number of acquisition requests acquired by the API 302 are received as arguments together with a request for the API name "RequestContentInfo", the digital camera 100 acquires the content ID, the file name, the file size, the file generation date and time of the content file stored in the storage area of the digital camera 100, and transmits the acquired information to the request-originator external device. Note that the content ID is an ID assigned to individually identify a content file. For the APIs in the present embodiment, the upper limit is set for the information regarding a content file that can be acquired at a time, depending on the size of the work memory 104. Accordingly, when the number of content files stored in the recording medium 110 and the like exceeds the upper limit for the APIs of the present embodiment. APIs need to be repeatedly requested.

An API 304 is an API for acquiring a content file stored in the storage area of the digital camera 100. If a content ID and a content size are received as arguments together with a request for the API name "RequestContent", the digital camera 100 transmits the corresponding content file to the request-originator external device. Note that, as for the content size, it is possible to select whether a content file is to he acquired in the original size or in a reduced size. The digital camera 100 generates a content file in accordance with a specified size, and transmits the content file as a response to the external apparatus. In the present embodiment, it is possible to specify whether a still image file is to he acquired in the original size or in a thumbnail size, for example. Accordingly, instead of a numerical value, a character string for identifying an original size or a thumbnail size can also be used as the size.

An API 305 is an API for acquiring changed information o information regarding the status of the digital camera 100. If a request for the API name "RequestEvent" has been received without any argument, the digital camera 100 acquires some or all of the information that can he acquired by the API 305. Note that the digital camera 100 does not immediately return a response to the request for the API 305. The digital camera 100 waits until the status of the digital camera 100 partially changes, and, upon detecting the change, the digital camera 100 returns only the changed information as a response. In the present embodiment, the API 305 is an API for acquiring battery information, for example.

An API 306 is an API for acquiring the ID of a content file that is transmitted by the digital camera 100 to the request-originator external device. If a request for the API name "RequestContentList" has been received without any argument, the digital camera 100 transmits a list of the corresponding content files to the request-originator external device. Note that the digital camera 100 does not immediately return a response to the request for the API 306. The digital camera 100 returns a response when an image to be transmitted to the request-originator external device is selected by the user from among the content files stored in the storage area of the digital camera 100.

An API 307 is an API for the digital camera 100 to interrupt transmission of a content file to the request-originator external device. If a request for the API name "CancelRequestContent" has been received without any argument, the digital camera 100 interrupts transmission, which is being performed according to the API 304 "RequestConent", of a content file being transmitted from the digital camera 100 to the request-originator external device. Note that the digital camera 100 interrupts transmission of not only a content file that is currently being forwarded, but also any content file that is subsequently scheduled to be transmitted to the request-originator external device. Note that the digital camera 100 does not display a UI for instructing cancellation of content file forwarding on the display unit 106 until the API 307 has been received. Also, the digital camera 100 does not immediately return a response to the request for the API 307. The digital camera 100 returns a response to the external apparatus when the digital camera 100 detects that a cancellation instruction operation has been made by the user.

An API 308 is an API for the digital camera 100 to interrupt transmission of a content file to the request-originator external device, or to acquire the changed information. If a request for the API name "RequestEventAndCancel" has been received without any argument, the digital camera 100 performs the above-described processing of the API 305 or the API 307. This API is used on shared-basis for the API 305 and the API 307, and may be used for both applications.

The foregoing has described the APIs in the embodiment. The above-described APIs are examples of main APIs, and various APIs for the control method of the digital camera 100 other than the above-described ones may also be provided. In addition, it is assumed that when transmitting a response to each of the above-described API requests, the digital camera 100 specifies the requested request, and transmits a return value (if any) for the request to the request originator. The response format is defined as "Response (API request name, return value)". For example, when the digital camera 100 receives a RequestProductInfo request from the external apparatus, and responds to the request, the response to the request originator will be "Response (RequestProductInfo, return valuer Note that it is sufficient that the request originator can be notified as to which API the response corresponds to, and the invention is not limited by the above-described examples.

In all embodiments that will be described below, the smart device 200 and the digital camera 100 constitute an image processing system via a network (a wireless LAN in the embodiment). Note that it is assumed that the control unit 101 of the digital camera 100 has already been shifted to the simple AP mode (the file server mode using the HTTP protocol in the initial state) using the operation unit 105. Content files in all of the embodiments will be described, taking an image file as an example. In the description of the embodiments, for example, "the smart device 200 transmits the API 301 "RequestProductInfo" to the digital camera 100" is expressed, for the purpose of simplification, as "the smart device 200 requests the RequestProductInfo 301 from the digital camera".

Sequence of Interrupting Image Forwarding from Digital Camera to Smart Device

In the following, a procedure for interrupting image forwarding of content files from the digital camera 100 to the smart device 200 in the above-described image processing system at any timing set by the digital camera 100 will be described with reference to FIGS. 4 to 7.

Figure 5A:
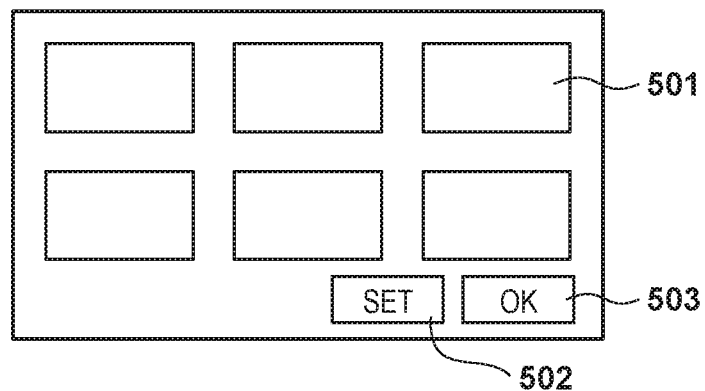
FIG. 5A is a diagram showing a user interface screen of a digital camera according to the embodiment.
Figure 5B:
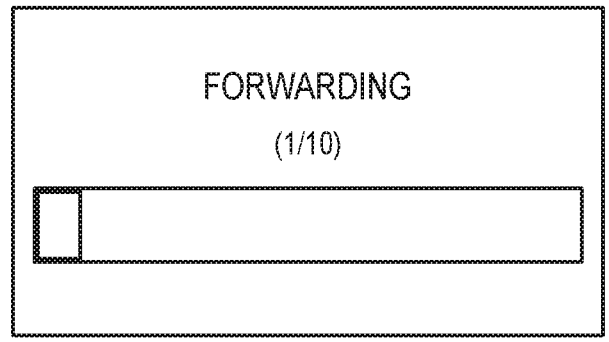
FIG. 5B is a diagram showing a user interface screen of the digital camera according to the embodiment.
Figure 5C:
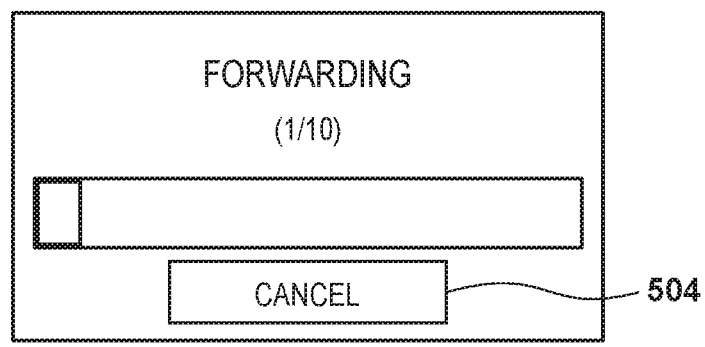
FIG. 5C is a diagram showing a user interface screen of the digital camera according to the embodiment.

FIG. 4 shows an example of a communication sequence between the smart device 200 and the digital camera 100. Specifically, the sequence is processing up to and including the smart device 200 acquiring a list of content files to be received from the digital camera 100, subsequently requesting, based on the list of the content files, transmission of an image from the smart device 200 to the digital camera 100, and the digital camera 100 transmitting the content files to the smart device 200. FIGS. 5A to 5C are diagrams showing user interfaces (UN) that are displayed on the display unit 106 by a program operating on the digital camera 100.

In step S401, the digital camera 100 and the smart device 200 establish a wireless local area network (LAN) connection. Here, a description will be given of processing performed when the digital camera 100 activates the simple AP and establishes a connection in response to a user operation.

After generating an SSID (Service Set Identifier) required to establish a wireless LAN connection and an encryption key, the control unit 101 of the digital camera 100 activates the simple AP using the SSID and the encryption key, and generates a wireless LAN network. At this time, the digital camera 100 displays, on the display unit 106, information for connecting to the simple AP provided by the digital camera 100, such as the SSID and the encryption key. Note that the SSID is the identifier of an access point in an IEEE 802.11 series wireless LAN, and is a name provided in order to prevent interference. The encryption key is the key for encrypting a wireless LAN to prevent unauthorized access to the SSID. Note that the SSID, the encryption key, and the like displayed here can be edited as appropriate by the user, and the previously used information is displayed provided that the information has not been changed or edited. Next, the control unit 101 activates a DHCP (Dynamic Host Configuration Protocol) server, and makes preparations such that an IP address can be assigned to a device that has joined the network generated by the simple AP.

Meanwhile, when processing for connecting to the wireless LAN network is started according to a user operation, the control unit 201 of the smart device 200 performs processing for searching for peripheral APs, as a result of which, a list of obtained SSIDs is displayed on the display unit 206. The user operates the operation unit 205 to select, from the SSID list displayed on the display unit 206, an SSID that matches the SSID of the simple AP that is displayed on e display unit 106 of the digital camera 100. Then, the user inputs, using the operation unit 205, the same key (character string) as the encryption key displayed on the display unit 106 of the digital camera 100. As a result, the control unit 201 of the smart device 200 starts joining the simple AP network generated by the digital camera 100. Note that the smart device 200 may store SSIDs to which it has previously connected to and the corresponding encryption keys, and, if the SSID selected by the user is included in the stored SSIDS, the smart device 200 may display the encryption key stored in association therewith in an encryption key input field as a default such that the user only needs to press (or touch) the OK button. As a result of the foregoing, an IP address is assigned to the smart device 200 from the digital camera 100, and connection to the wireless LAN is completed. Although an example in which the digital camera 100 also serves as a DHCP server is described here, it is conceivable to adopt a configuration in which the digital camera 100 and the smart device 200 each connect to a local network constructed by a router.

In step S402, the smart device 200 performs discovery processing. Then, the digital camera 100 and the smart device 200 recognize each other's presence and services provided. In addition, the smart device 200 makes preparations to perform communication using the APIs provided by the digital camera 100 via a wireless LAN. Note that examples of the protocol used for discovery include SSDP (Single Service Discovery Protocol) and Multicast DNS. The SSDP and the Multicast DNS are known protocols, and therefore descriptions thereof are omitted.

An example of the discovery processing will be described. The control unit 101 of the digital camera 100 transmits an advertise notification to a network that it generated itself and notifies the smart device 200 of its presence. Upon receiving the advertise notification from the digital camera 100, the control unit 201 of the smart device 200 acquires, from the digital camera 100, a discovery description in which the device information of the digital camera 100 is described, and determines whether or not the digital camera 100 provides an API service. If it is determined that the digital camera 100 provides an API service, the control unit 201 loads, from the nonvolatile memory 203 to the work memory 204, a program for acquiring image files from the digital camera 100 by using APIs, and executes the program.

In step S403, the control unit 201 requests the Request-ProductInfo 301 from the digital camera 100 via the communication unit 211. In step S404, upon detecting that this request has been received via the communication unit 111, the control unit 101 acquires the product name, the manufacturer name, the firmware version, and the serial number from the nonvolatile memory 103, and forms a response data set from the acquired information. Then, the control unit 101 transmits the formed data set to the smart device 200 via the communication unit 111.

In step S405, the control unit 201 requests the Request-MemoryInfo 302 from the digital camera 100 via the communication unit 211. In step S406, upon detecting that this request has been received via the communication unit 111, the control unit 101 acquires the storage area ID, the available storage capacity, the free space, and the number of stored content files from the work memory 104 or the recording medium 110, and forms a response data set from the acquired information. Then, the control unit 101 transmits the formed data set to the smart device 200 via the communication unit 111.

In step S407, the control unit 201 requests the Request-ContentList 306 from the digital camera 100 via the communication unit 211. Upon detecting that this request has been received via the communication unit 111, in step S408, the control unit 101 of the digital camera 100 selectably displays, on the display unit 106 of the digital camera 100, a thumbnail list of images recorded in the storage medium 110, as shown in FIG. 5A. Then, the control unit 101 prompts user selection to determine images to be forwarded to the smart device 200.

In step S409, when the user selects images to be forwarded on the display unit 106 of the digital camera 100 using the selection button 502, and touches the OK button 503, the control unit 101 displays an image being forwarded on the display unit 106, as shown in FIG. 5B. At this time, the control unit 101 stores a list of IDs of the selected images in the work memory 104. Thereafter, in step S410, the control unit 101 acquires, from the work memory 104, a list of the Ws of the transmission images selected by the user, and forms a response data set from the list. Then, the control unit 101 transmits the formed data set to the smart device 200 via the communication unit 111.

As a result, the control unit 201 of the smart device 200 can acquire information specifying the images selected by the user.

In step S411, the control unit 201 requests the CancelRequestContent 307 from the digital camera 100 via the communication unit 211. This is done in order to enable a transmission interrupting operation from the digital camera side. Upon detecting that this request has been received via the communication unit 111, the control unit 101 of the digital camera 100 additionally displays a cancel button 504 on the display unit 106 of the digital camera 100, as shown in FIG. 5C. The control unit 201 does not immediately return a response to this request, and places the response in a deferred state. By intentionally placing this request in a deferred state, the digital camera 100 can transmit data to the smart device 200 at any timing. In the present embodiment, the digital camera 100 returns the response at the timing at which the cancel button 504 is pressed as per a user operation. Transmitting data from the server side to the client at any timing in this manner is called a "server push", and a technique for implementing a server push by creating an intentional response deferred state is called "long polling".

In step S412, the control unit 201 requests the Request Content 304 from the digital camera 100 via, the communication unit 211. In step S413, upon detecting that this request has been received via the communication unit 111, the control unit 101 acquires, from the work memory 104 or the recording medium 110, the content file (image file selected by the user) corresponding to the specified content ID, and forms a response data set from the content file. Then, the control unit 101 transmits the formed data set to the smart device 200 via the communication unit 111.

Thereafter, from steps S414 and S415 onward, the same processing as the processing in steps S412 and S413 is repeated. That is, normally, the processing is repeated until forwarding of all of the images selected by the user from the digital camera 100 to the smart device is completed. A description will be given of a case where the user cancels the forwarding for some reason during that time.

Now, it is assumed that, in step S416, in which an image is being forwarded, the user has pressed the cancel button 504 shown in FIG. 5C by operating the operation unit 105. In this case, in step S417, the control unit 101 transmits the response data for step S411 to the smart device 200 via the communication unit 111.

In step S418, upon detecting an instruction to end the program as instructed by the user, in step S419, the control unit 201 ends communication with the digital camera 100. That is, if the end instruction is detected, the control unit 201 ends the communication, regardless of whether or not receiving of all of the images initially selected by the user is complete.

In step S420, processing for disconnecting communication between the digital camera 100 and the smart device 200 is completed.

The foregoing is an example of the method for interrupting the acquisition of a content file from the digital camera 100 when the smart device 200 connects to the digital camera 100 and acquires the content file.

Details of Processing Performed in Digital Camera 100

Figure 6A:
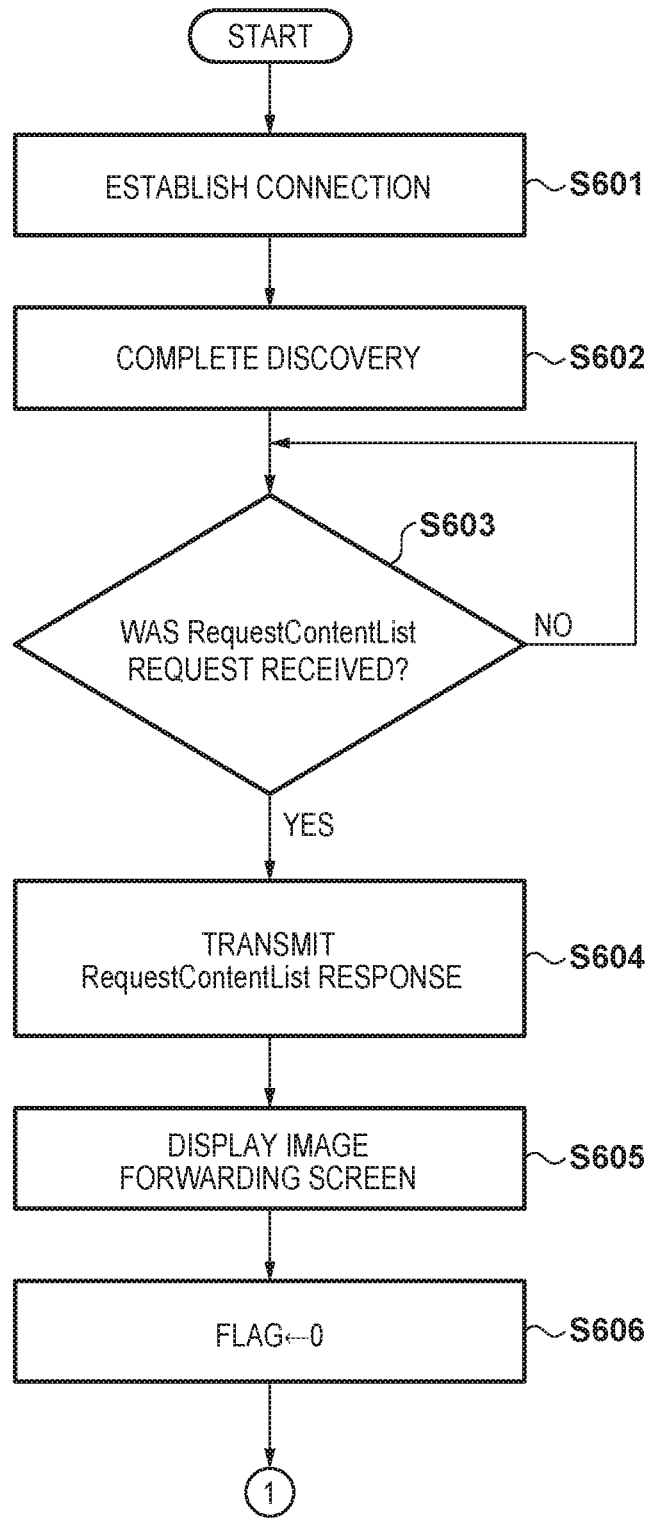
FIG. 6A is a flowchart illustrating a processing procedure of the digital camera according to the first embodiment.

The flow of processing performed in the digital camera 100 will be described. FIGS. 6A and 6B show a flowchart illustrating the flow of processing of the API service performed in the digital camera 100.

In step S601, the control unit 101 establishes a wireless local area network (LAN) connection between the digital camera 100 and the smart device 200. This processing is similar to the processing performed in the digital camera 100, described with regard to step S401, and therefore a description thereof is omitted.

In step S602, the control unit 101 performs discovery, the digital camera. 100 and the smart device 200 recognize each other's presence and services provided, and the control unit 101 prepares to perform communication using the APIs provided by the digital camera 100 via a wireless LAN. This processing is similar to the processing performed in the digital camera 100, described with regard to step S402, and therefore a description thereof is omitted.

In step S603, the control unit 101 detects whether or not the API RequestContentList request has been received via the communication unit 111. If the request is detected, the processing advances to step S604. If not, the processing is repeated.

In step S604, the control unit 101 displays a UI indicating a list of image information shown in FIG. 5A, and accepts an image selection operation performed by the user. Then, if the selection has ended (the OK button in FIG. 5A has been pressed), the control unit 101 generates an information list (or image list) including IDs for specifying the selected images via the communication unit 111, and transmits the information list as a response to the API RequestContentList.

In step S605, the control unit 101 displays, on the display unit 106, a UI indicating the state of progress of the forwarding shown in FIG. 5B.

In step S606, the control unit 101 initializes (a value indicating non-reception) a flag FLAG for determining whether or not the CancelRequestContent request has been received. Note that the flag is secured at a predetermined address of the work memory 104.

In step S607, the control unit 101 detects whether or not the API Request Content request has been received via the communication unit 111. If the request has been received, the control unit 101 advances to step S608. If not, the control unit 101 advances the processing to step S609.

In step S608, the control unit 101 transmits a response to the API Request Content via the communication unit 111. This response is transmission of image data indicated by the ID described in the Request Content request. When this response processing ends, the control unit 101 returns the processing to step S607.

On the other hand, if the processing advances to step S609, the control unit 101 determines whether or not the API CancelRequestContent request has been received via the communication unit 111. If this request has been received, the control unit 101 advances the processing to step S610. If not, the control unit 101 advances the processing to step S612.

In step S610, since the API CancelRequestContent request has been received, the control unit 101 sets the flag FLAG to "1". Then, in step S611, the control unit 101 displays the cancel button 504 shown in FIG. 5C on the display unit 106. After this, the control unit 101 returns the processing to step S607.

In step S612, the control unit 101 determines whether or not the flag FLAG is "1". In other words, it can also be said that the control unit 101 determines whether or not the CancelRequestContent request has been received, or determines whether or not the cancel button 504 has already been displayed in a UI. If the flag FLAG is "1", the control unit 101 advances the processing to step S613. If the flag FLAG is "0", the control unit 101 returns the processing to step S607.

In step S613, the control unit 101 determines whether or not the user pressed the cancel button 504 by operating the operation unit 105. If the cancel button 504 has been pressed, the control unit 101 advances the processing to step S614, and, if the cancel button 504 has not been pressed, the control unit 101 returns the processing to step S607.

In step S614, the control unit 101 transmits a response to the API CancelRequestContent via the communication unit 111. That is, the control unit 101 notifies the smart device 200 that an operation to cancel image forwarding has been performed by the user. Thereafter, the control unit 101 receives an instruction to end connection from the smart device 200, and ends the processing.

Details of Processing Performed in Smart Device 200

Next, a description will be given of the flow of processing performed in the smart device 200 when acquiring status information regarding the digital camera 100, when acquiring content list displays or content files obtained through remote shooting.

Figure 7:
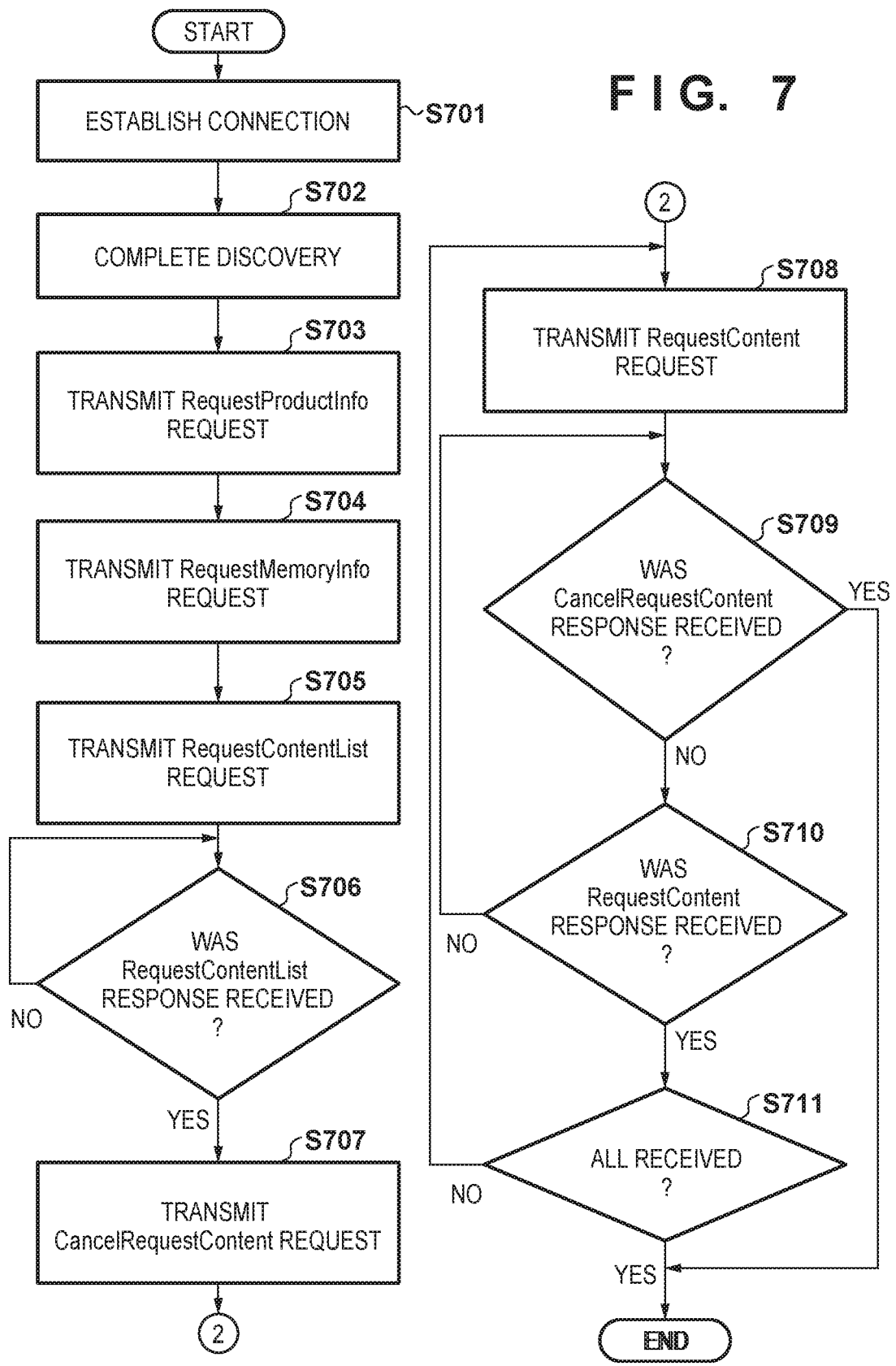
FIG. 7 is a flowchart illustrating the processing procedure of the smart device according to the first embodiment.

FIG. 7 is a flowchart illustrating the flow of processing of an application executed in the smart device 200.

In step S701, the control unit 201 establishes a wireless local area network (LAN) connection between the digital camera 100 and the smart device 200. This processing is similar to the processing performed in the smart device 200, described with regard to step S401, and therefore a description thereof is omitted.

in step S702, the control unit 201 performs discovery, the digital camera 100 and the smart device 200 recognize each other's presence and services provided, and the control unit 201 prepares to perform communication using APIs provided by the digital camera 100 via a wireless LAN. This processing is similar to the processing performed in the smart device 200, described with regard to step S402, and therefore a description thereof is omitted.

In step S703, the control unit 201 transmits RequestProductInfo to the digital camera 100. This processing is similar to the processing described with regard to step S403, and therefore a description thereof is omitted.

In step S704, the control unit 201 transmits RequestMemoryInfo to the digital camera 100. This processing is similar to the processing described with regard to step S405, and therefore a description thereof is omitted.

In step S705, the control unit 201 transmits RequestContentList to the digital camera 100. This processing is similar to the processing described with regard to step S407, and therefore a description thereof is omitted.

In step S706, the control unit 201 determines whether or not a response (information list in which the IDs of images to be forwarded are described) to RequestContentList has been received via the communication unit 211. If a response has been received, the control unit 201 advances the processing to step S707, otherwise the control unit 201 waits until a response has been received.

In step S707, the control unit 201 transmits CancelRequestContent to the digital camera 100 via the communication unit 211. This processing is similar to the processing described with regard to step S411, and therefore a description thereof is omitted.

In step S708, the control unit 201 transmits RequestContent to the digital camera 100. That is, the control unit 201 requests a transmission request for one of the images selected by the user to the digital camera 100. Also, this processing is the processing described with regard to step S412.

In step S709, the control unit 201 determines whether or not a response to the API CancelRequestContent has been received via the communication unit 211. If the response to CancelRequestContent has been received, the control unit 201 interrupts image reception processing, and ends the processing by transmitting an instruction to end connection to the digital camera 100. If it is determined that a CancelRequestContent response has not been received, the control unit 201 advances the processing to S710.

In step S710, the control unit 201 determines whether or not an API RequestContent response (image data) has been received via the communication unit 211. If the Request Content response has been received, in step S711, the control unit 201 determines whether or not receiving of all of the images has ended. If not, to acquire the next image, the control unit 201 returns the processing to step S708 in order to receive the next image from the digital camera 100. On the other hand, if the receiving of image data of interest is not complete, the control unit 201 returns the processing to step S709 in order to determine whether or not cancellation processing has been performed by the user.

As described above, according to the present embodiment, forwarding can be interrupted via the operation unit on the digital camera side when the user forwards captured images stored and held in the digital camera to the smart device.

In the first embodiment above, an example has been described in which the forwarding of an image is cancelled by operating the digital camera 100 while the image is being forwarded. The API CancelRequestContent used for the cancellation of image forwarding can also be used in the same manner for the status notification for the digital camera 100.

Therefore, in a second embodiment, an example will be described in which a dedicated API, CancelRequestContent, is used to cancel image forwarding, and another API, RequestEvent, is used for the status notification regarding the digital camera.

In a third embodiment, an example will be described in which an API, RequestEventAndCancel, used on a shared basis for cancelling image forwarding and making a status notification for the digital camera is used.

Second Embodiment

Figure 8A:
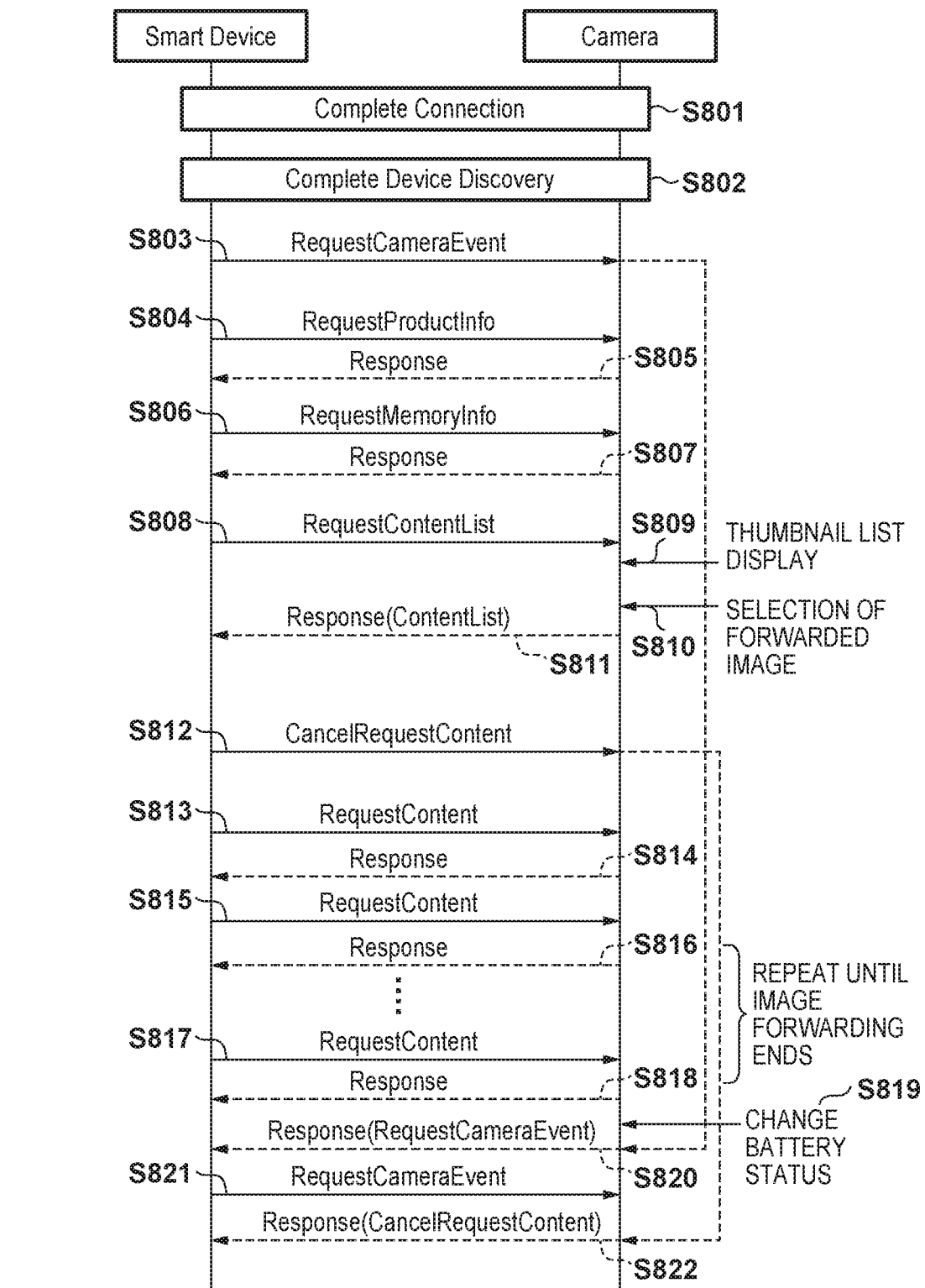
FIG. 8A is a diagram showing an example of a communication sequence between a digital camera and a smart device according to a second embodiment.
Figure 8B:
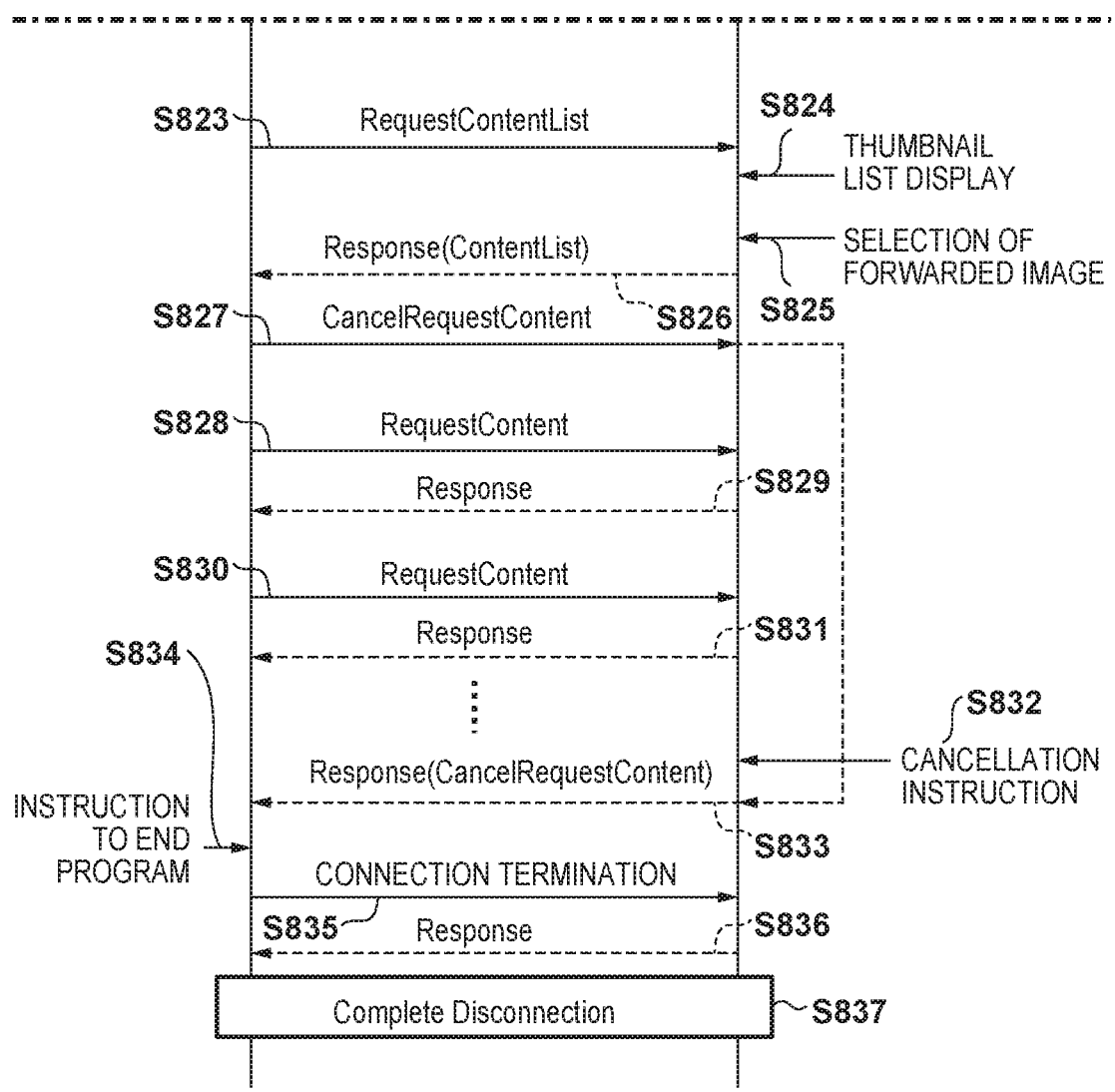
FIG. 8B is a diagram showing the example of a communication sequence between a digital camera and a smart device according to the second embodiment.

Sequence for Case Where Image Forwarding API and Camera Status Notification API are Used Separately FIGS. 8A and 8B show an example including a communication sequence for a case where the cancellation of image forwarding between the smart device 200 and the digital camera 100 is not performed, according to a second embodiment. Specifically, this is an example in which a dedicated. API 307 is used to cancel image forwarding, and another API 305 is used for the status notification regarding the digital camera 100.

The processing in steps S801 and S802 is similar to the processing in steps S401 and S402 shown in FIG. 4, described in the first embodiment, and therefore a description thereof are omitted.

In step S803, the control unit 201 requests the RequestEvent 305 from to the digital camera 100 via, the communication unit 211. Even if this request has been received via the communication unit 111, the control unit 101 of the digital camera 100 does not immediately return a response. If this request has been received, the control unit 101 starts monitoring changes in the status (status change) of the camera 100, and returns a response to the RequestEvent 305 only after there has been a change in the status. In the second embodiment, an example when a notification regarding the status of the battery is made is described. Of course, aside from the battery status, it is also possible to use any other parameter as long as it indicates an internal status of the camera.

The processing from steps S804 to S818 is similar to the processing in steps S414 and S415 shown in FIG. 4, described in the first embodiment, and therefore a description thereof is omitted.

In step S819, the battery status has changed. In step S820, upon detecting that the battery status of the digital camera 100 has changed, the control unit 101 forms a response data set from the battery information for the RequestEvent 305 requested in step S803, and transmits the response data set to the smart device 200 via the communication unit 111.

In step S821, the control unit 201 requests the RequestEvent 305 from the digital camera 100 via the communication unit 211. Execution of step S821 enables the status notification for the digital camera 100 to be provided to the smart device 200 again.

In step S822, the control unit 101 transmits a response to the CancelRequestContent 307 to the digital camera 100 via the communication unit 111. This is done for the following reason: the image forwarding that started in step S813 was not cancelled, and therefore a response is always returned to the CancelRequestContent 307 if the image forwarding processing is completed normally, thus preventing consumption of resources.

The processing in steps S823 to S837 is similar to the processing in steps S407 to S420 shown in FIG. 4, described in the first embodiment, and therefore a descriptions thereof is omitted.

Details of Processing Performed in Digital Camera 100

Figure 9A:
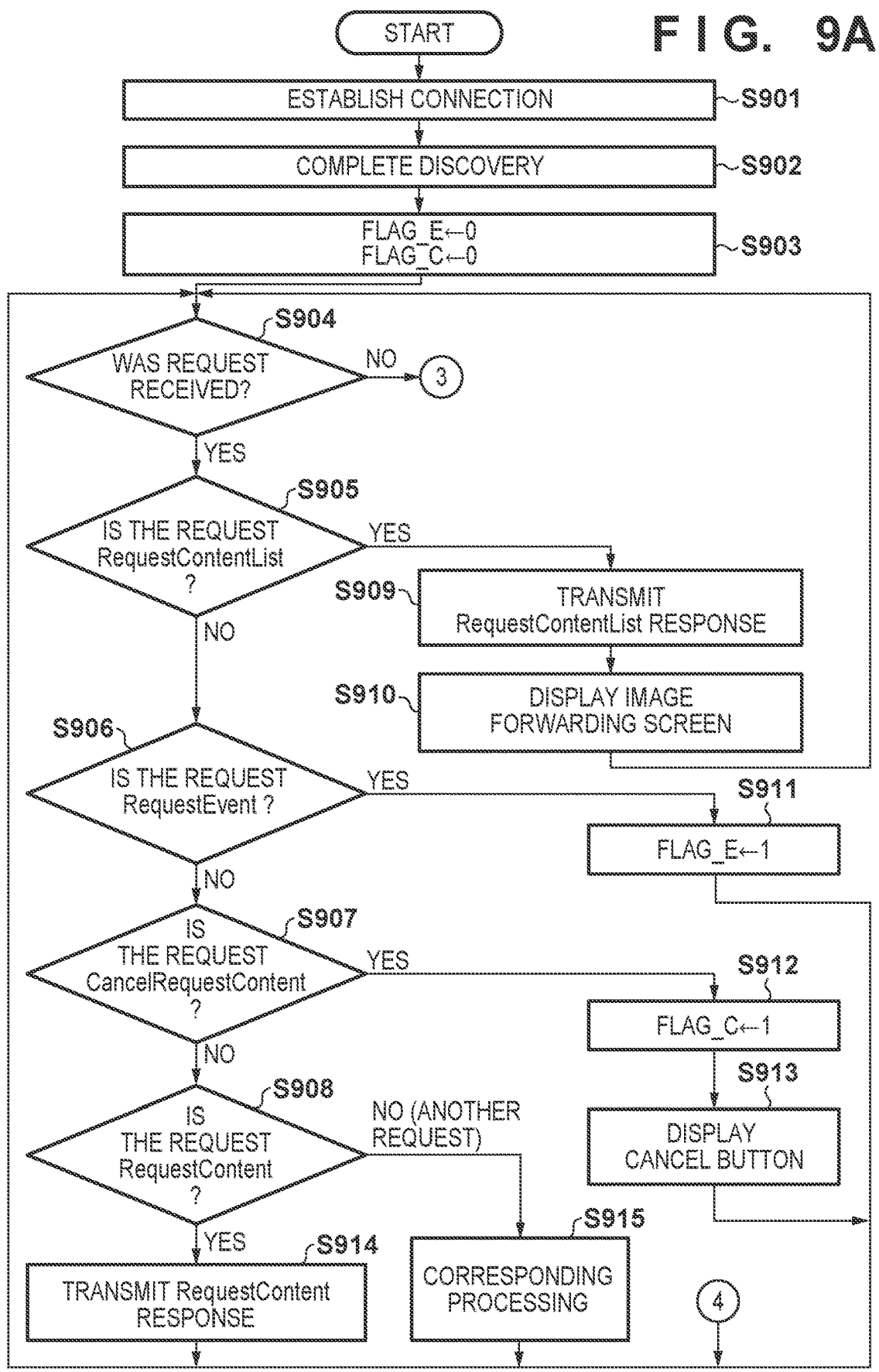
FIG. 9A is a flowchart illustrating a processing procedure of the digital camera according to the second embodiment.
Figure 9B:
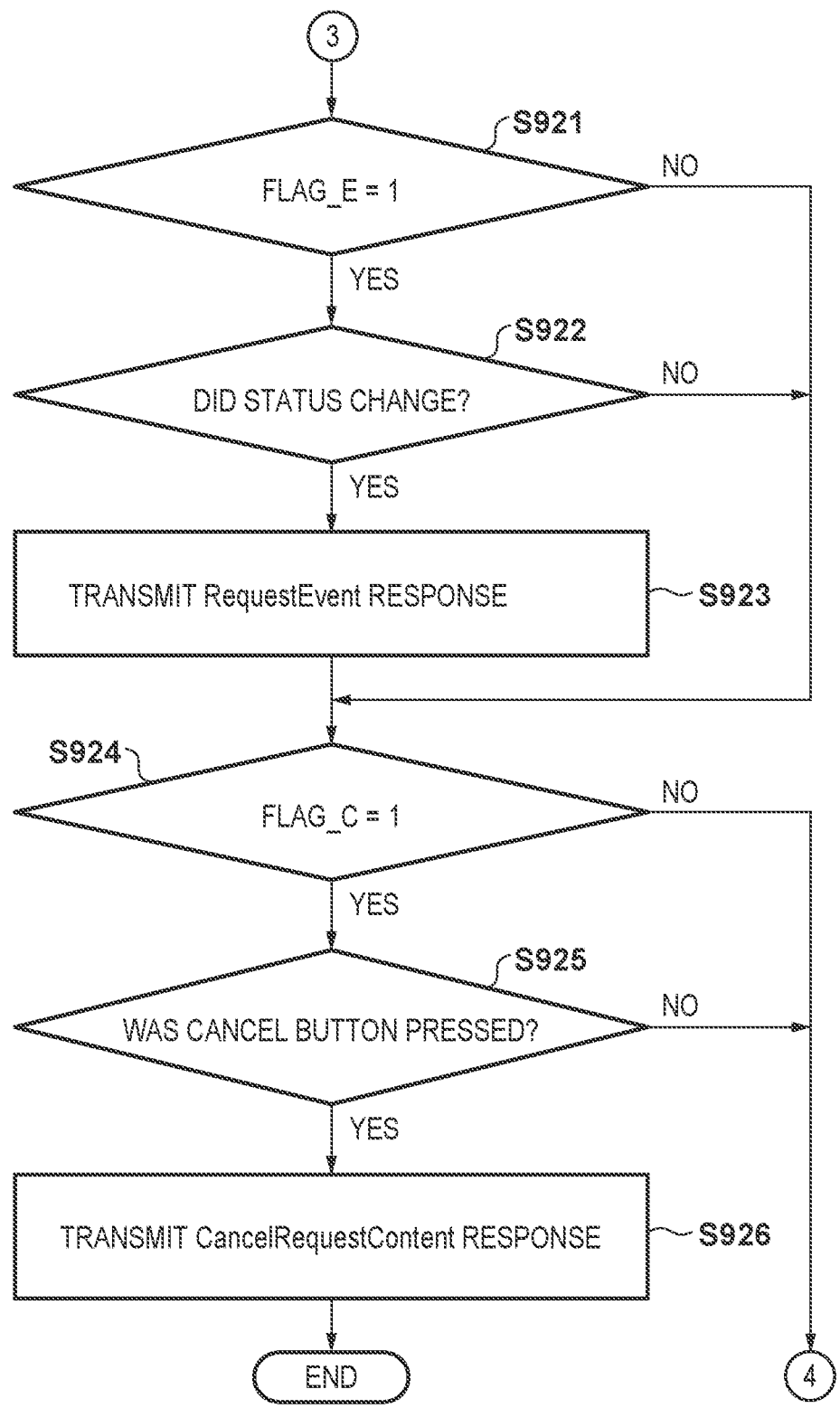
FIG. 9B is a flowchart illustrating the processing procedure of the digital camera according to the second embodiment.

The flow of processing performed in the digital camera 100 will be described. FIGS. 9A and 9B show a flowchart showing the flow of processing of the API service performed in the digital camera 100. The following description will be given with reference to FIGS. 9A and 9B.

The processing in steps S901 and S902 is similar to the processing in steps S601 and S602 shown in FIG. 6A, described in the first embodiment, and therefore a description thereof is omitted.

In step S903, the control unit 101 clears flags FLAG_E and FLAG_C that have been secured in advance in the work memory 104 to zero. The flag FLAG_E is a flag for determining whether or not a RequestEvent request has been received, and the flag FLAG_C is a flag for determining whether or not a CancelRequestContent request has been received, The processing in step S903 is performed to mark both requests as having not been received.

In step S904, the control unit 101 determines whether or not any request has been received from the smart device 200 via the communication unit 111. If a request has been received, in the subsequent steps S905 through S908, the control unit determines the types of received requests, and performs processing corresponding to each type. On the other hand, if it is determined that no request has been received, the control unit 101 advances the processing to step S921.

If the received request is a RequestContentList request, the control unit 101 advances the processing from step S905 to S909. Then, in step S909, the control unit 101 transmits a response to the RequestContentList. This transmission is the same as step S604 in the first embodiment. Then, in step S910, the control unit 101 starts displaying an image forwarding screen. Also, this processing is the same as step S605 in the first embodiment. After this, the control unit 101 returns the processing to step S904.

If the received request is a RequestEvent request, the control unit 101 advances the processing from step S906 to step S911. In step S911, in order to indicate that the RequestEvent request has been received, the control unit 101 sets the flag FLAG_E to "1". Then, the control unit 101 returns the processing to step S904.

If the received request is a CancelRequestContent request, the control unit 101 advances the processing from step S907 to step S912. In step S912, in order to indicate that the CancelRequestContent request has been received, the control unit 101 sets the flag FLAG_C to "1". Then, in step S913, the control unit 101 displays the cancel button 504 on the display screen. After this, the control unit 101 returns the processing to step S904.

In the embodiment, it is assumed that the forwarding screen has already been displayed before the CancelRequestContent request was received; however, if the RequestContentList request was received after the CancelRequestContent request was received, in step S910, the control unit 101 displays a forwarding screen including the cancel button 504.

If the received request is a RequestContent request, the control unit 101 advances the processing from step S908 to step S914. In step S914, the control unit 101 transmits a response to the RequestContent request. This transmission processing is the same as step S608 in the first embodiment. After this, the control unit 101 returns the processing to step S904.

If the received request is a request other than the above-described requests, the control unit 101 advances the processing from step S908 to step S915, and performs the processing corresponding to the received request. Then, the control unit 101 returns the processing to step S904.

In step S904, if it is determined that no request has been received, the control unit 101 advances the processing to step S921. In step S921, the control unit 101 determines whether or not the flag FLAG_E is "1", or in other words, determines whether or not the RequestEvent request has already been received. If FLAG=0 (not received), the control unit 101 skips the processing in steps S922 and S923, and advances the processing to step S924. If the flag FLAG_E is "1" (already received), in step S922, the control unit 101 determines whether or not there has been a change in the battery status or the like of the digital camera. 100. If there is no change, the control unit 101 advances the processing to step S924. If there has been a change, in step S923, the control unit 101 creates a response message in which the details of the change are described, and transmits the response message as a response to the RequestEvent request. Then, the control unit 101 advances the processing to step S924.

In step S924, the control unit 101 determines whether or not the flag FLAG_C is "1", or in other words, determines whether or not the CancelRequestContent request has already been received. If FLAG_C=0 (not received), the control unit 101 returns the processing to step S904. If FLAG_C=1 (already received), the control unit 101 advances the processing to step S925. In step S925, the control unit 101 determines whether or not the cancel button 504 has been pressed. If th.e cancel button 504 has not been pressed, the control unit 101 returns the processing to step S904. If it is determined that the cancel button 504 has been pressed, the control unit 101 advances the processing to step S926. In step S926, the control unit 101 generates a response message for the CancelRequestContent request, and transmits the response message. The processing in step S926 is the same as step S614 in the first embodiment.

Details of Processing Performed in Smart Device 200

Figure 10B:
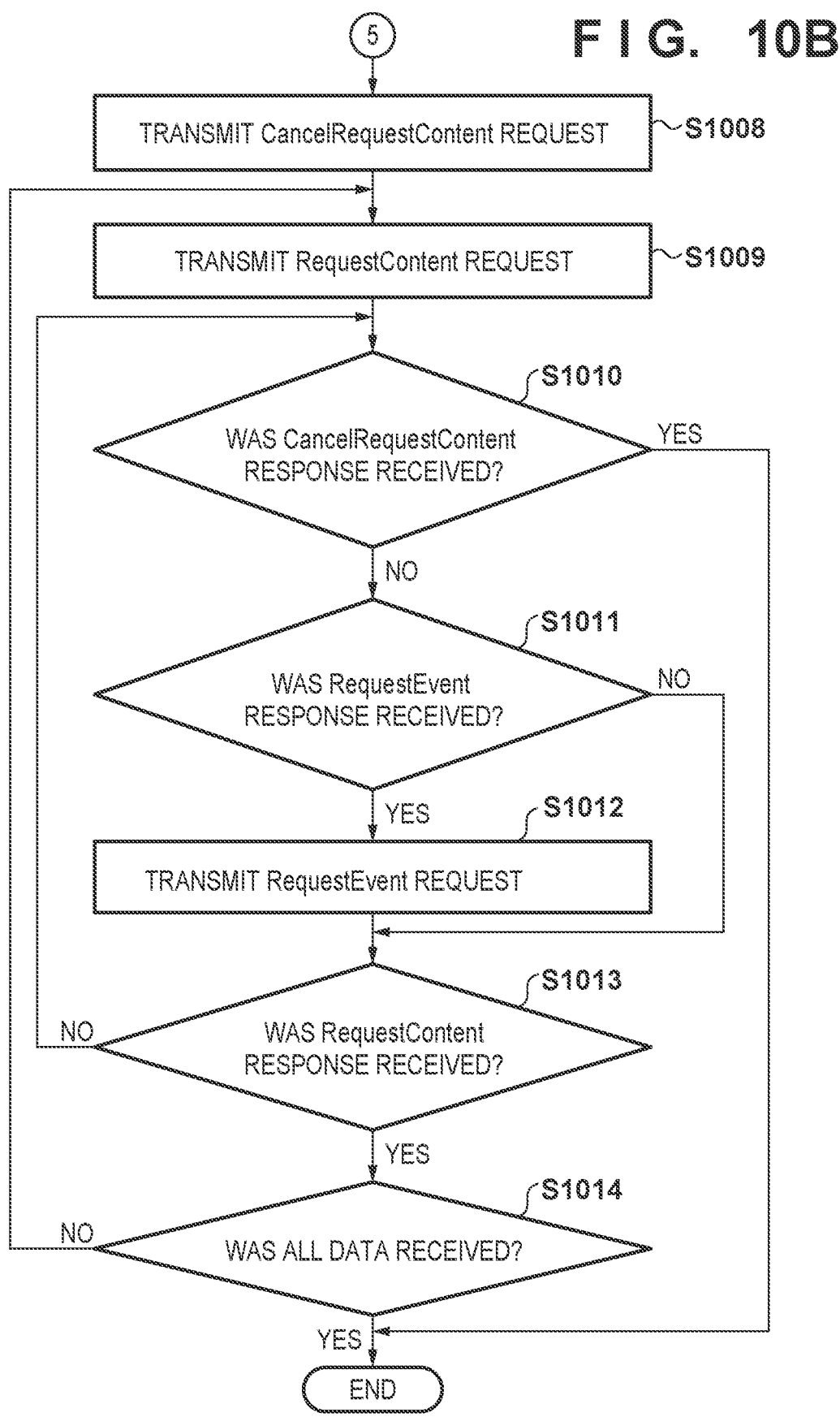
FIG. 10B is a flowchart illustrating the processing procedure of the smart device according to the second embodiment.

Next, the flow of processing performed in the smart device 200 will be described with reference to the flowchart shown in FIGS. 10A and 10B.

The processing in steps S1001 to S1004 is similar to the processing in steps S701 to S704 shown in FIG. 7, described in the first embodiment, and therefore a description thereof is omitted.

In step S1005, the control unit 201 transmits a request for the RequestEvent 305 to the digital camera 100. The processing steps S1006 to S1010 is similar to the processing in steps S705 to S709 shown in FIG. 7, described in the first embodiment, and therefore a description thereof has been omitted.

In step S1010, the control unit 201 determines whether or not a response to the API CancelRequestContent has been received via the communication unit 211. If a response has been received, the control unit 201 interrupts the image reception processing, and ends the processing by transmitting an instruction to end connection to the digital camera 100. If it is determined that a response to the Cancel RequestContent has not been received, the control unit 201 advances the processing to step S1011.

In step S1011, the control unit 201 determines whether or not a response to the RequestEvent 305 has been received, if not, the control unit 201 advances the processing to step S1013. If a response to the RequestEvent 305 has been received, in step S1012, the control unit 201 performs the processing corresponding to the status of the digital camera, and transmits the request for the RequestEvent 305 to the digital camera 100 again in order to receive a notification if there is a change in the status at a. later time.

Step S1013 is similar to the processing in step S710 shown in FIG. 7, described in the first embodiment, and therefore a description thereof is omitted.

In step S1014, the control unit 201 determines whether or not all of the images in the RequestContentList received in step S1007 have been received. If not, the control unit 201 returns the processing to step S1009 in order to receive the next image. On the other hand, if the receiving of all of the images is complete, the control unit 201 ends the communication in order to end this processing.

Third Embodiment

Figure 11A:
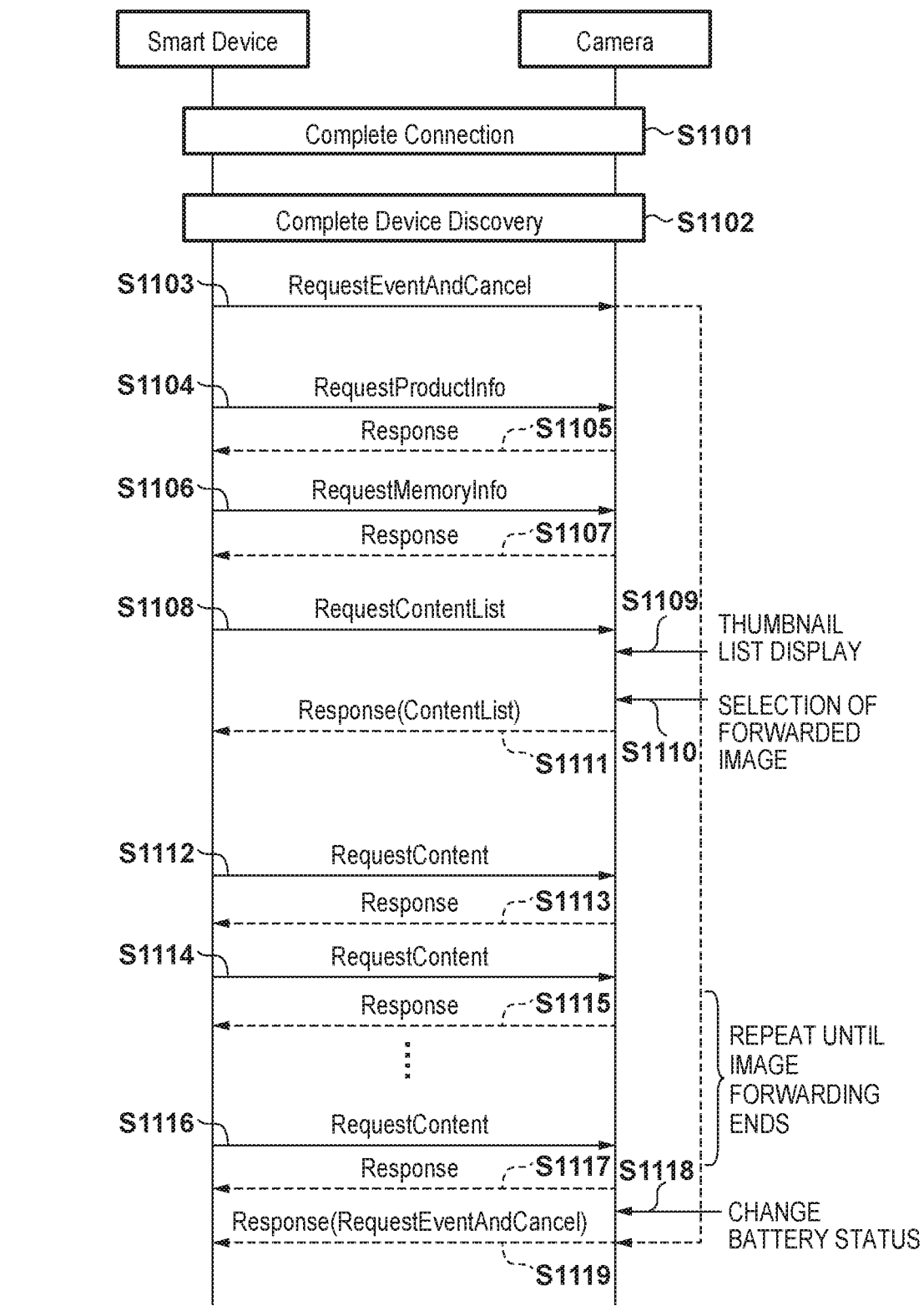
FIG. 11A is a diagram showing an example of a communication sequence between a digital camera and a smart device according to a third embodiment.

Sequence for Case Where Image Forwarding API and Status Notification API for Camera are Used Separately FIGS. 11A and 11B show an example including a communication sequence for a case where the cancellation of image forwarding between the smart device 200 and the digital camera 100 is not performed, according to the third embodiment. Specifically, this is an example in which an API R.equestEventAndCancel 308 used on a shared basis for the cancellation of image forwarding and the status notification for the digital camera 100 is used.

The processing in steps S1101 and S1102 is similar to the processing in steps S401 and S402 shown in FIG. 4, described in the first embodiment, and therefore a description is omitted.

In step S1103, the control unit 201 requests the RequestEventAndCancel 308 from the digital camera 100 via the communication unit 211. Even if it is determined that this request has been received via the communication unit 111, the control unit 101 of the digital camera 100 does not immediately return a response. The control unit 101 returns a response in the image forwarding cancellation processing that is subsequently performed, or when the status of the camera has changed.

The processing in steps S1104 to S1117 is similar to the processing in steps S804 to S811 and steps S813 to S18 shown in FIGS. 8A and 8B, described in the second embodiment, and therefore a descriptions thereof is omitted.

It is assumed that the battery status has changed in step S1118. In this case, in step S1119, the control unit 101 detects that the battery status of the digital camera 100 has changed, then forms a response data set from the battery information for the RequestEventAndCancel 308 requested in step S1103, and transmits the response data to the smart device 200 via the communication unit 111.

In step S1120, to enable this response to be received again, the control unit 201 requests the RequestEventAndCancel 308 from the digital camera 100 via the communication unit 211. Execution of step S1120 enables the status notification for the digital camera 100 to be provided to the smart device 200 again, and also enables cancellation of image forwarding.

The processing in steps S1121 to S1128 is similar to the processing in steps S823 to S826 and steps S828 to 831 shown in FIGS. 8A and 8B, described in the second embodiment, and therefore a description thereof is omitted.

In step S1129, upon detecting that the battery status of the digital camera 100 has changed, the control unit 101 forms a response data set from the battery information for the RequestEventAndCancel 308 requested in step S1120, and transmits the response data set to the smart device 200 via the communication unit 111.

The processing in steps S1132 to S1135 is similar to the processing in steps S834 to S837 shown in FIGS. 8A and 8B, described in the second embodiment, and therefore a description thereof has been omitted.

Details of Processing Performed in Digital Camera 100

Figure 12A:
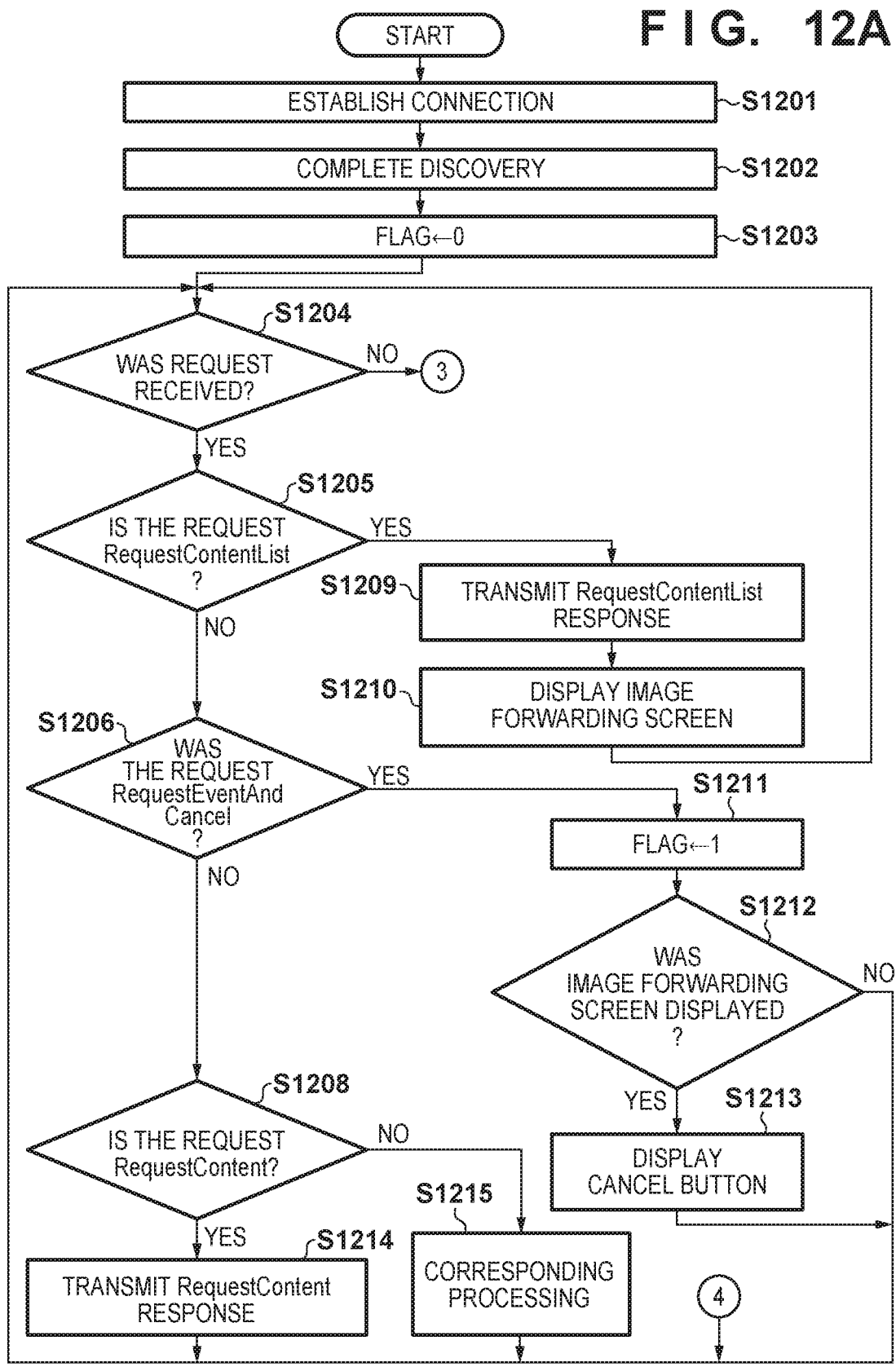
FIG. 12A is a flowchart illustrating a processing procedure of the digital camera according to the third embodiment.
Figure 12B:
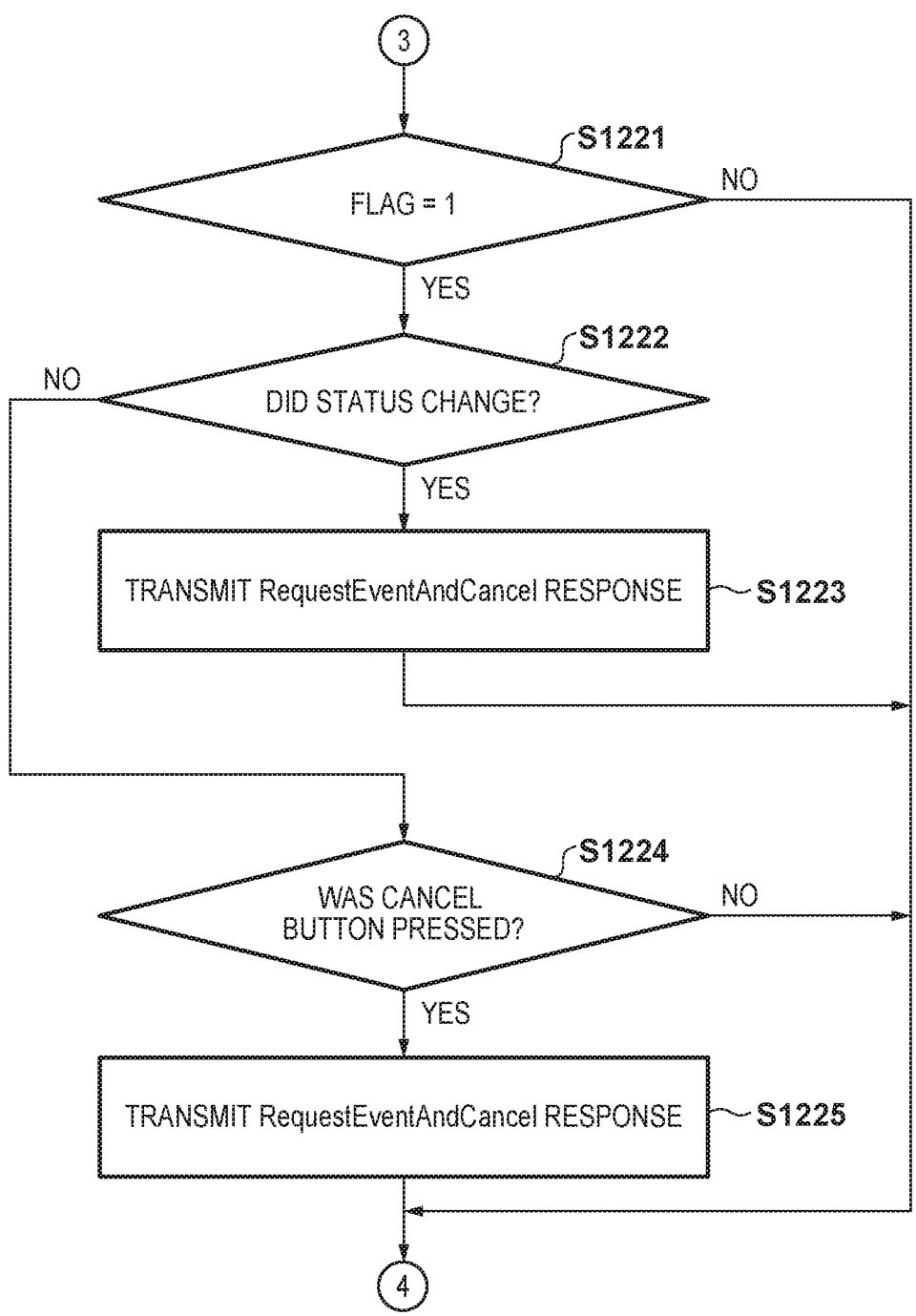
FIG. 12B is a flowchart illustrating the processing procedure of the digital camera according to third embodiment.

The flow of processing performed in the digital camera 100 will be described. FIGS. 12A and 12B show a flowchart illustrating the flow of processing of the API service performed in the digital camera 100. In the following, a description will be given with reference to FIGS. 12A and 12B, The processing in steps S1201 and S1202 is similar to the processing in steps S601 and S602 shown in FIG. 6A, described in the first embodiment, and therefore a description thereof is omitted.

In step S1203, the control unit 101 clears the flag FLAG secured in advance in the work memory 104 to zero. The flag FLAG is used to determine whether or not a RequestEventAndCancel request has been received. The processing in step S1203 is performed to mark the RequestEventAndCancel request as not having been received.

In step S1204, the control unit 101 determines whether or not any request has been received from the smart device 200 via the communication unit 111. If a request has been received, in the subsequent steps S1205, S1206, and S1208, the control unit determines the types of received requests, and performs the processing corresponding to each type. On the other hand, if it is determined that no request has been received, the control unit 101 advances the processing to step S1221.

If the received request is a RequestContentList request, the control unit 101 advances the processing from step S1205 to S1209. Then, in step S1209, the control unit 101 transmits a response to RequestContentList, This transmission is the same as the transmission in step S604 in the first embodiment. Then, in step S1210, the control unit 101 starts displaying an image forwarding screen. Also, this processing is the same as step S605 in the first embodiment. After this, the control unit 101 returns the processing to step S1204.

If the received request is a RequestEventAndCancel request, the control unit 101 advances the processing from step S1206 to S1211. In step S1211, in order to indicate that the RequestEventAndCancel request has been received, the control unit 101 sets the flag FLAG to "1". Then, in step S1212, the control unit 101 determines whether or not the image forwarding screen is displayed. If the image forwarding screen is not displayed, the control unit 101 returns the processing to step S1204. If the image forwarding screen is displayed, the control unit 101 displays the cancel button 504 in step S1213. After this, the control unit 101 returns the processing to step S1204.

Note that in the embodiment, if the CancelRequestContent request has been received after reception of the Request- EventAndCancel request, the flag is set to "1", and the control unit 101 displays a forwarding screen including the cancel button 504.

If the received request is a RequestContent request, the control unit 101 advances the processing from step S1208 to step S1214, in step S1214, the control unit 101 transmits a response to the RequestContent request. This transmission processing is the same as step S608 in the first embodiment. After this, the control unit 101 returns the processing to step S1204.

If the received request is a request other than the above-described requests, the control unit 101 advances from step S1208 to step S1215, and performs the processing corresponding to the received request, Then, the control unit 101 returns the processing to step S1204.

In step S1204, if it is determined that no request has been received, the control unit 101 advances the processing to step S1221. In step S1221, the control unit 101 determines whether or not the flag FLAG is "1", or in other words, whether or not a RequestEventAndCancel request has been received. If FLAG=0 (not received), the control unit 101 returns the processing to step S1204.

If the flag FLAG is "1" (already received), in step S1222, the control unit 101 determines whether or not there has been a change in the battery status or the like of the digital camera 100. If there is no change, the control unit 101 advances the processing to step S1224. If there has been a change, in step S1223, the control unit 101 creates a response message in which the details of the change are described, and transmits the response message as a response to the RequestEventAndCancel request. Then, the control unit 101 returns the processing to step S1204.

In step S1224, the control unit 101 determines whether or not the cancel button 504 has been pressed. If the cancel button 504 has not been pressed, the control unit 101 returns the processing to step S1204. If it is determined that the cancel button 504 has been pressed, the control unit 101 advances the processing to step S1225 in step S1225, the control unit 101 creates a message indicating that the cancel button 504 has been pressed, and transmits the message as a response to the RequestEventAndCancel request. Then, the control unit 101 returns the processing to step Details of Processing Performed in Smart Device 200

Figure 13A:
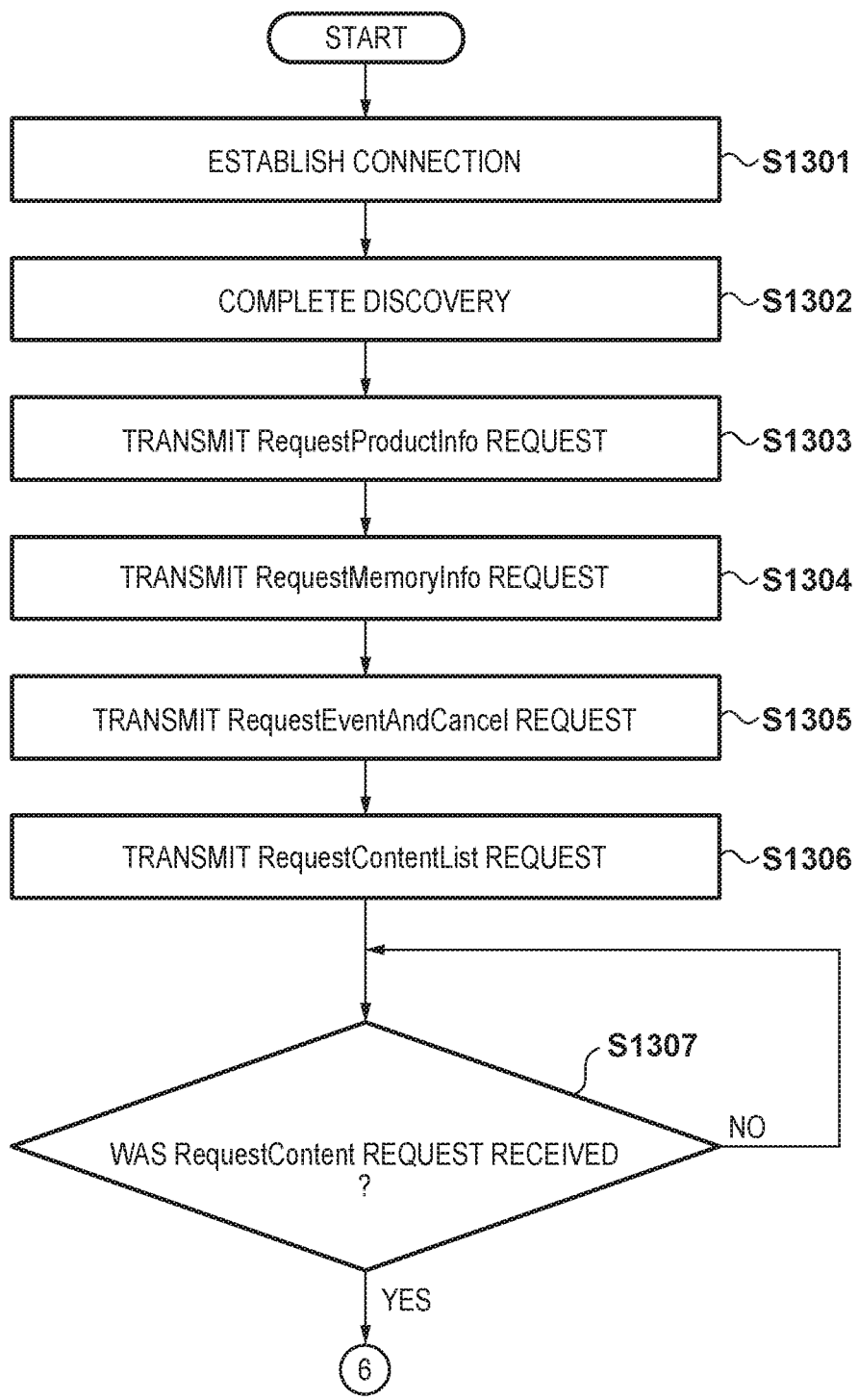
FIG. 13A is a flowchart illustrating a processing procedure of the smart device according to the third embodiment.
Figure 13B:
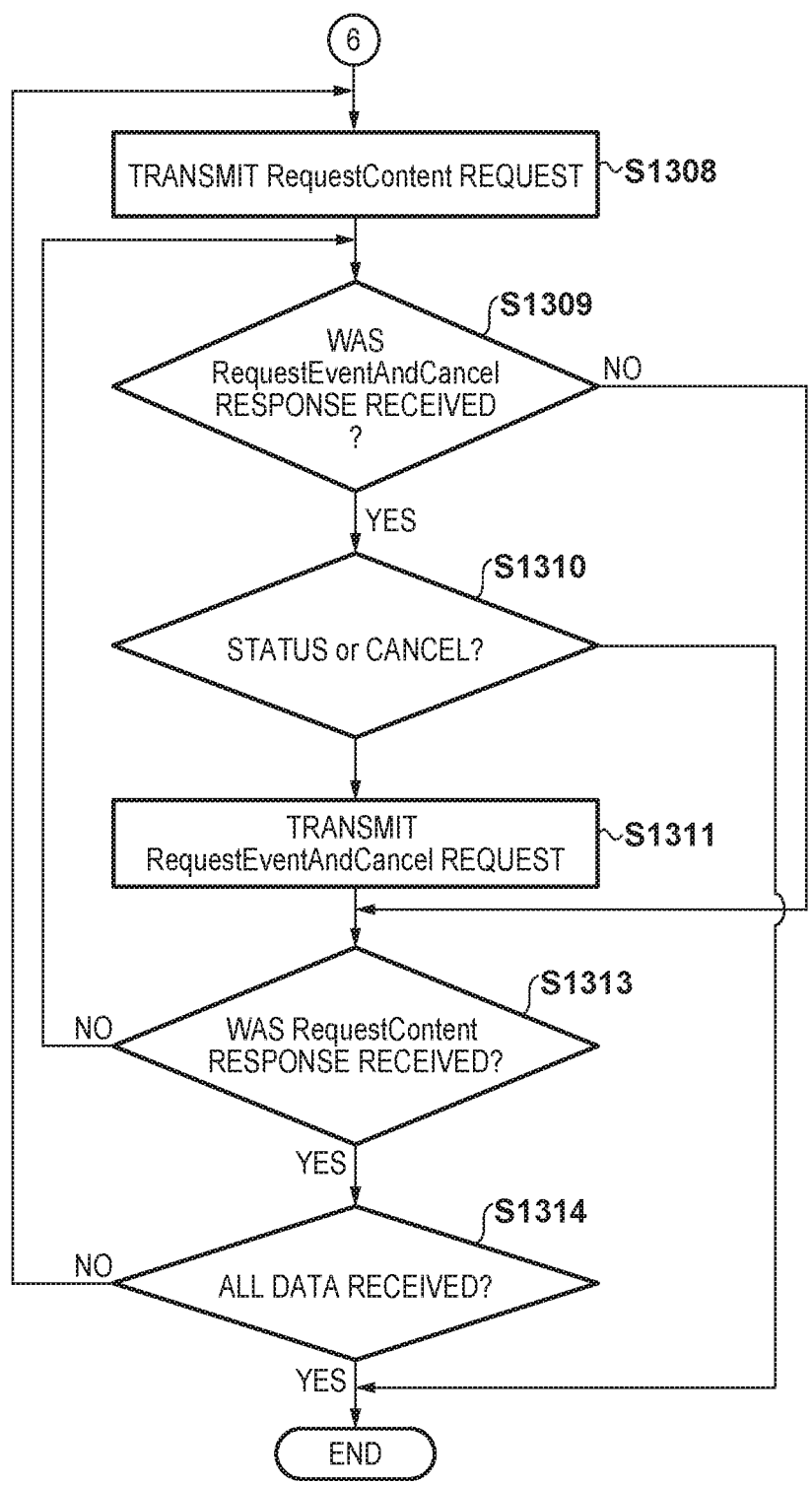
FIG. 13B is a flowchart illustrating the processing procedure of the smart device according to the third embodiment.

Next, the flow of processing performed in the smart device 200 will be described with reference to the flowchart shown in FIGS. 13A and 13B.

The processing in steps S1301 to S1304 is similar to the processing in steps S701 to S704 shown in FIG. 7, described in the first embodiment, and therefore a description thereof is omitted.

In step S1305, the control unit 201 transmits a request for the RequestEventAndCancel 308 to the digital camera 100. The processing in steps S1306 to S1308 is similar to the processing in steps S705 to S708 shown in FIG. 7, described in the first embodiment, and therefore a description thereof is omitted.

In step S1309, the control unit 201 determines whether or not a response to the API RequestEventAndCancel request has been received via the communication unit 211. If the response to the RequestEventAndCancel request has been received, the control unit 201 advances the processing to step S1310, and if not, the control unit 201 advances the processing to step S1313.

In step S1310, the control unit 201 analyzes the received response to the RequestEventAndCancel request, and determines whether the response is a response notifying of a change in the status of the digital camera, or a response indicating that cancellation of image forwarding has been instructed. Then, if the response indicates that the cancellation of image forwarding has been instructed, the control unit 201 ends this communication processing.

On the other hand, if the response indicates a status change, in step S1311, the control unit 201 performs the processing corresponding to the status of the digital camera 100, and transmits a request for the RequestEventAndCancel 308 to the digital camera 100 again in order to receive a notification if there is a change in status at a later time. Then, the control unit 201 advances the processing to step S1313.

Step S1313 is similar to the processing in step S710 shown in FIG. 7, described in the first embodiment, and therefore a description thereof is omitted.

In step S1314, the control unit 201 determines whether or not all of the images in the RequestContentList received in step S1307 have been received. If not, the control unit 201 returns the processing to step S1308 in order to receive the next image. On the other hand, if the receiving of all of the images is complete, the control unit 201 ends the communication in order to end this processing.

According to the present invention, forwarding of information can be interrupted on the server side at a timing desired by a user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer ay comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication system comprising a client, and a server that transmits information in response to a request from the client, wherein the client includes a first request unit configured to transmit a content request to the server,
wherein the server includes
a first response unit configured to transmit content requested from the first request unit to the client,
wherein the client further includes
a second request unit configured to request the server to make a response if a predetermined status has occurred, and
wherein the server further includes
a second response unit configured to defer, if the request made by the second request unit is received, a response if the predetermined status has not occurred, and transmit the response to the client if the predetermined status has occurred.

2. The communication system according to claim 1, wherein the client includes
a first acquisition unit configured to transmit, as the first request unit, a request for an information list of objects to be forwarded, and acquire the information list,
a second acquisition unit configured to make a request to the server for pieces of information indicated in the information list acquired by the first acquisition unit, and acquire each of the pieces of information, and
an end unit configured to end processing relating to receiving information, if a response to the second request unit is received.

3. The communication system according to claim 2, wherein the server includes
a first display unit configured to list and display the objects to be forwarded such that the objects to be forwarded are selectable to a user, if the request for the information list is received, and
a generating unit configured to generate a list in which information specifying information selected by the user from among the information listed and displayed is described, and
wherein the first response unit responds with the list generated by the generating unit as the information list.

4. The communication system according to claim 1, wherein the server is an image capturing apparatus including an image capturing unit, and a storage configured to store an image obtained by the image capturing unit,
wherein the client is a portable terminal for receiving the image from the server, and
wherein the server and the client each perform communication via wireless communication units.

5. The communication system according to claim 1, wherein the second response unit includes a second display unit configured to display, if the request from the second request unit is received, a UI for interrupting forwarding of information, and, if the UI is operated, make a response indicating that the predetermined status has occurred.

6. The communication system according to claim 2, wherein the second response unit includes
a second display unit configured to display a UI for interrupting forwarding of information, if the request from the second request unit is received, and
a monitoring unit configured to monitor whether or not a preset status change has occurred, and
wherein the second response unit transmits, if the U1 is operated, a response indicating that the operation has been performed, and transmits, if the status change has occurred, a response indicating that the status change has occurred, to the client, and
wherein the end unit ends the processing relating to receiving of information if a response indicating operation of the UI is received, and, if a response indicating a status change other than the operation of the UI is received, causes the second request unit to make another request from the second request unit again.

7. A communication apparatus comprising:
a first reception unit configured to receive a content request from a client;
a first transmission unit configured to transmit content corresponding to the content request to the client, in response to the first reception unit receiving the content request;
a second reception unit configured to receive a predetermined request from the client;
a display unit configured to display a UI for interrupting content transmission processing performed by the first transmission unit, if the predetermined request is received by the second reception unit; and
a second transmission unit configured to transmit a predetermined response to the predetermined request to the client, if the UI displayed by the display unit is operated,
wherein the content transmission processing performed by the first transmission unit is interrupted by the second transmission unit transmitting a response.

8. A control method of a communication apparatus, the method comprising:
a first reception step of receiving a content request from a client;
a first transmission step of transmitting content corresponding to the content request to the client, in response to receiving the content request in the first reception step;
a second reception step of receiving a predetermined request from the client;
a display step of displaying a UI for interrupting content transmission processing performed by the first transmission step, if the predetermined request is received in the second reception step; and
a second transmission step of transmitting a predetermined response to the predetermined request to the client, if the UI displayed in the display step is operated,
wherein the content transmission processing performed by the first transmission step is interrupted by transmission of a response in the second transmission step.

9. A non-transitory computer-readable storage medium storing a program which, when read and executed by a computer, causes the computer to execute the steps of the method, the method comprising:
a first reception step of receiving a content request from a client;
a first transmission step of transmitting content corresponding to the content request to the client, in response to receiving the content request in the first reception step;
a second reception step of receiving a predetermined request from the client;
a display step of displaying a UI for interrupting content transmission processing performed by the first transmission step, if the predetermined request is received in the second reception step; and
a second transmission step of transmitting a predetermined response to the predetermined request to the client, if the UI displayed in the display step is operated, wherein the content transmission processing performed by the first transmission step is interrupted by transmission of a response in the second transmission step.

10. A server apparatus that communicates with a client apparatus, the server apparatus comprising:
- a first reception unit configured to receive, from the client apparatus, a first request for executing predetermined processing;
- a first processing unit configured to start the predetermined processing in response to the first reception unit receiving the first request;
- a second reception unit configured to receive, from the client apparatus, a second request for interrupting the predetermined processing performed by the first processing unit; and
- a control unit configured to control ansmission of a response to the first and second requests,
- wherein the control unit defers a response to the second request while the first processing unit performs the predetermined processing in response to the first request, and transmits the deferred response to the second request if the first processing unit interrupts the predetermined processing.

11. The server apparatus according to claim 10, further comprising
a display unit configured to perform display for accepting an instruction to interrupt the predetermined processing performed by the first processing unit, in response to the second reception unit receiving the second request.

12. The server apparatus according to claim 11, wherein the first processing unit interrupts the predetermined processing in response to the display unit accepting an instruction to interrupt the predetermined processing.

13. The server apparatus according to claim 10, wherein the predetermined processing is processing for transmitting content included in the server apparatus to the client apparatus in response to the first request.

14. The server apparatus according to claim 10, wherein the second reception unit receives the second request before the first reception unit receives the first request.

* * * * *